(12) United States Patent
Ericksen et al.

(10) Patent No.: US 9,320,114 B1
(45) Date of Patent: *Apr. 19, 2016

(54) LIGHTING CONTROLLER

(71) Applicant: Orbit Irrigation Products, Inc., North Salt Lake, UT (US)

(72) Inventors: Kent C. Ericksen, Centerville, UT (US); Stuart Eyring, Bountiful, UT (US); Karl L. Connolly, Bountiful, UT (US); Landon T. Gwilliam, Taylorsville, UT (US); Brad Wardle, Kaysville, UT (US)

(73) Assignee: Orbit Irrigation Products, Inc., North Salt Lake, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/606,385

(22) Filed: Jan. 27, 2015

Related U.S. Application Data

(63) Continuation of application No. 13/549,274, filed on Jul. 13, 2012, now Pat. No. 8,957,588.

(51) Int. Cl.
*H05B 33/08* (2006.01)
*H05B 37/02* (2006.01)

(52) U.S. Cl.
CPC .................. *H05B 37/0218* (2013.01)

(58) Field of Classification Search
None
See application file for complete search history.

(56) References Cited

U.S. PATENT DOCUMENTS

| | | | |
|---|---|---|---|
| 5,589,741 A * | 12/1996 | Terman et al. ............... 315/360 |
| 7,019,276 B2 * | 3/2006 | Cloutier et al. ......... 250/214 AL |
| 8,957,588 B1 | 2/2015 | Ericksen et al. |
| 2009/0026978 A1 * | 1/2009 | Robinson ..................... 315/294 |
| 2011/0062888 A1 | 3/2011 | Bondy et al. |
| 2012/0274219 A1 * | 11/2012 | Woytowitz et al. .......... 315/152 |
| 2013/0026953 A1 | 1/2013 | Woytowitz |

OTHER PUBLICATIONS

Orbit Irrigation Products, Inc., the sprinkler timers shown in Attachment A were sold or offered for sale by Orbit Irrigation Products, Inc., on or before Jul. 12, 2011.
Orbit Irrigation Products, Inc., Users Manual for a sprinkler timer (Shown in Attachment B), published on or before Jul. 12, 2011.
Office Action for U.S. Appl. No. 13/549,274 (Shown in Attachment C), mailed on Apr. 1, 2014.

* cited by examiner

*Primary Examiner* — Douglas W Owens
*Assistant Examiner* — Dedei K Hammond
(74) *Attorney, Agent, or Firm* — Austin Rapp & Hardman

(57) ABSTRACT

A lighting controller comprising a control module is disclosed. The control module transmits electrical current to various sets of lights in accordance with scheduling data for each set of lights. The scheduling data may include start data and stop data for each set of lights.

20 Claims, 22 Drawing Sheets

| Scheduling Data 86 |  |
|---|---|
| First Set 121a | |
| First Start Data 120a | First Stop Data 122a |
| Second Start Data 120b | Second Stop Data 122b |
| Second Set 121b | |
| Third Start Data 120c | Third Stop Data 122c |
| Fourth Start Data 120d | Fourth Stop Data 122d |
| Third Set 121c | |
| Fifth Start Data 120e | Fifth Stop Data 122e |
| Sixth Start Data 120f | Sixth Stop Data 122f |

Figure 6

| First Start Data 120a | |
|---|---|
| First Start Mode 124a | 11:05 pm, All |
| Second Start Mode 124b | Light Level: 33, Sa-Su |

Figure 7

| First Stop Data 122a | |
|---|---|
| First Stop Mode 132a | 1:05 am, Every Other Day |
| Second Stop Mode 132b | Light Level: 10, Sa-Sun |

Figure 8

LIGHTING CONTROLLER

RELATED APPLICATIONS

The application claims priority to and is a continuation application of U.S. patent application Ser. No. 13/549,274 entitled LIGHTING CONTROLLER filed on Jul. 13, 2012. The foregoing application is incorporated herein by this reference in its entirety.

TECHNICAL FIELD

The disclosed subject matter relates an apparatus and, in particular, a lighting controller.

BACKGROUND

Illumination in or around a home or other building mitigates safety and crime risks. However, turning lights on and off can be time consuming and is often easily forgotten. Accordingly, an improved lighting controller is desirable.

SUMMARY

The following presents a simplified summary of the disclosed embodiments in order to provide a basic understanding of such embodiments. This summary is not an extensive overview of all contemplated embodiments, and is intended to neither identify key or critical elements nor to delineate the scope of such embodiments. Its sole purpose is to present some concepts of the disclosed embodiments in a simplified form as a prelude to the more detailed description that is presented later.

Various embodiments of lighting controllers are disclosed. In one such embodiment, the lighting controller includes a control module configured to transmit electrical current in accordance with a first set of scheduling data to a first set of one or more lights, in accordance with a second set of scheduling data to a second set of one or more lights, and in accordance with a third set of scheduling data to a third set of one or more lights. The first set of scheduling data may include at least first start data and first stop data, the second set of scheduling data may include at least second start data and second stop data, and the third set of data may include at least third start data and third stop data.

The lighting controller may further comprise a light-detected module configured to receive a first type of light-detected signal from a light detector.

The lighting controller may also include a start-mode module. The start-mode module is configured to receive a first start-mode signal indicating either a first start mode, in which the first start data specifies a particular time of day for transmission of electrical current to the first set of one or more lights, or a second start mode, in which the first start data specifies transmission of electrical current to the first set of one or more lights in response to receipt of the first type of light-detected signal.

The lighting controller may also include a start-time module configured to receive first start data specifying the particular time of day for the first start data when in the first start mode.

In various embodiments, the first, second, and third start data are independently configurable. Also, the first, second and third stop data may be independently configurable. In addition, the first, second, and third start data may be jointly configurable.

The start-time module may be configured to receive a days-of-the-week signal specifying days of the week for the first start data.

The control module may comprise a switched-mode power supply configured to transmit a fault-message signal when a maximum load is exceeded.

In various other embodiments, the lighting controller comprises a control module configured to transmit electrical current in accordance with a first set of scheduling data to a first set of one or more lights, in accordance with a second set of scheduling data to a second set of one or more lights, and in accordance with a third set of scheduling data to a third set of one or more lights. The first set of scheduling data may include at least first start data and first stop data, the second set of scheduling data may include at least second start data and second stop data, and the third set of data may include at least third start data and third stop data.

The lighting controller may also comprise a light-detected module configured to receive a first type of light-detected signal and a second type of light-detected signal from a light detector.

The lighting controller may include a start-mode module configured to receive a first start-mode signal indicating either, a first start mode, in which the first start data specifies a particular time of day for transmission of electrical current to the first set of one or more lights, or a second start mode, in which the first start data specifies transmission of electrical current to the first set of one or more lights in response to receipt of the first type of light-detected signal.

The disclosed lighting controller may also comprise a stop-mode module configured to receive a first stop-mode signal indicating either, a first stop mode, in which the first stop data specifies a particular time of day for termination of transmission of electrical current to the first set of one or more lights, or a second stop mode, in which the first stop data specifies termination of transmission of electrical current to the first set of one or more lights in response to receipt of the second type of light-detected signal.

In various embodiments, the first, second, and third start data are independently configurable. Also, the first, second and third stop data may be independently configurable. In addition, the first, second, and third start data may be jointly configurable.

A start-time module may be configured to receive a days-of-the-week signal specifying days of the week for the first start data.

The control module may comprise a switched-mode power supply configured to transmit a fault-message signal when a maximum load is exceeded.

Another embodiment of a lighting controller is disclosed. This embodiment may include a control module configured to transmit electrical current in accordance with a first set of scheduling data to a first set of one or more lights, in accordance with a second set of scheduling data to a second set of one or more lights, and in accordance with a third set of scheduling data to a third set of one or more lights. The first set of scheduling data may include at least first start data and first stop data, the second set of scheduling data may include at least second start data and second stop data, and the third set of data may include at least third start data and third stop data.

The lighting controller may include a light-detected module configured to receive a first type of light-detected signal from a light detector.

The lighting controller may also include a start-mode module configured to receive a first start-mode signal indicating either, a first start mode, in which the first start data specifies a particular time of day for transmission of electrical current to the first set of one or more lights, or a second start mode, in which the first start data specifies transmission of electrical current to the first set of one or more lights in response to receipt of the first type of light-detected signal.

A start-time module may be configured to receive first start data specifying a particular time of day for first start data when in the first start mode.

A motion-detected module may be configured to receive a first motion-detected signal from a first motion detector and to signal the control module to transmit electrical current to at least one of the first, second and third sets of one or more lights in response to receipt of the first motion-detected signal irrespective of the first start data, the second start data, and the third start data.

The motion-detected module may be configured to signal the control module to transmit electrical current to only the first set of one or more lights in response to receipt of the first motion-detected signal.

The motion-detected module may be configured to signal the control module to transmit electrical current to each of the first, second, and third sets of one or more lights in response to receipt of the first motion-detected signal.

A duration module may be configured to receive a duration signal specifying a period of time during which at least one of the first, second, and third sets of lights is to be provided with electrical current in response to receipt of the first motion-detected signal.

The motion-detected module may be further configured to receive a second motion-detected signal from a second motion detector and a third motion-detected signal from a third motion detector.

The motion-detected module may be configured to signal the control module to transmit electrical current to the first set of one or more lights in response to receipt of the first motion-detected signal irrespective of the first start data, and may be configured to signal the control module to transmit electrical current to the second set of one or more lights in response to receipt of the second motion-detected signal irrespective of the second start data, and may be configured to signal the control module to transmit electrical current to the third set of one or more lights in response to receipt of the third motion-detected signal irrespective of the third start data. The first, second, and third start data may be independently configurable. Also, the first, second and third stop data may be independently configurable.

One or more embodiments comprise the features hereinafter fully described and particularly pointed out in the claims. The following description and the annexed drawings set forth in detail certain illustrative aspects of the disclosed embodiments. These aspects are indicative, however, of but a few of the various ways in which the principles of various embodiments may be employed. Further, the disclosed embodiments are intended to include all such aspects and their equivalents.

BRIEF DESCRIPTION OF THE DRAWINGS

Exemplary embodiments of the disclosed subject matter will become more fully apparent from the following description and appended claims, taken in conjunction with the accompanying drawings. Understanding that these drawings depict only exemplary embodiments and are, therefore, not to be considered limiting of the disclosed subject matter's scope, the exemplary embodiments of the disclosed subject matter will be described with additional specificity and detail through use of the accompanying drawings in which:

FIG. 6 is a table illustrating one embodiment of scheduling data;

FIG. 7 is a table illustrating one embodiment of start data;

FIG. 8 is a table illustrating one embodiment of stop data; and

Figure 1:
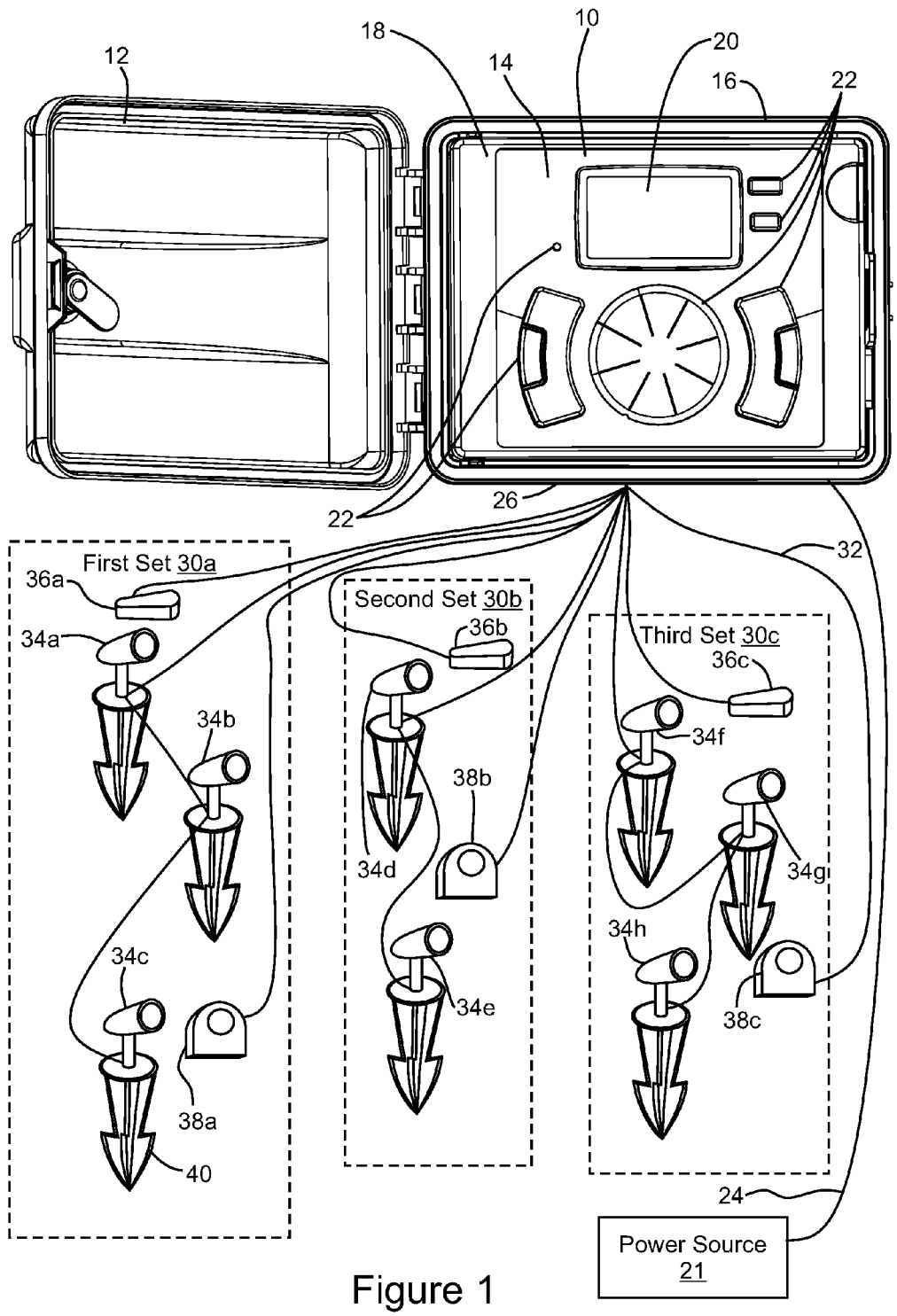
FIG. 1 is a perspective view of one embodiment of a lighting controller shown connected to various lights, motion detectors, and light detectors and to a power supply.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may (but not in all cases) be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Features from the disclosed embodiments may be combined with other embodiments disclosed herein. Further, the terms an "embodiment," "one embodiment," or various "embodiments" do not refer to a single embodiment or group of embodiments of the disclosed subject matter. Instead, features disclosed in connection with an "embodiment" or "embodiments" may be used in connection with other features or components of the disclosed subject matter.

Embodiments of the disclosed subject matter will be best understood by reference to the drawings. It will be readily understood that the components of the disposed subject matter, as generally described and illustrated in the figures herein, could be arranged and designed in a wide variety of different configurations. Thus, the following more detailed description of the embodiments of the apparatus, system, and method of the disclosed subject matter, as represented in accompanying figures, is not intended to limit the scope of the disclosed subject matter, as claimed, but is merely representative of embodiments of the disclosed subject matter.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abut" refers to items that are in direct physical contact with each other, although the items may be attached, secured, fused, or welded together. The terms "integrally formed" refer to a body that is manufactured integrally, i.e., as a single piece, without requiring the assembly of multiple pieces. Multiple parts may be integrally formed with each other if they are formed from a single workpiece.

FIG. 1 comprises a perspective view of one embodiment of a lighting controller 10 shown with various lights 34a-h, motion detectors 36a-c, and light detectors 38a-c (e.g., photocells). The illustrated lighting controller 10 may comprise a pivoting cover 12, pivoting control panel 14, and base 16. The illustrated lighting controller 10 includes a user interface 18 disposed on the pivoting control panel 14. The pivoting cover 12 may include a seal to protect the lighting controller 10 from water and dust. The user interface 18 may include a display screen 20 and various controls 22, which will be discussed in additional detail below. The lighting controller 10 may also comprise a housing 26 to protect electrical components of the lighting controller 10. The lighting controller 10 may be in electrical communication with a power source 21 via an electrical transmission line 24. In one embodiment, the lighting controller 10 may comprise a portable power source (not shown).

The lighting controller 10 may independently control a first set 30a of one or more lights 34a-c, a second set 30b of one or more lights 34d-e, and a third set 30c of one or more lights 34f-h. The lights 34a-h within each set 30a-c may be connected in serial fashion, as illustrated in FIG. 1, or, alternatively, the lights 34a-h may each be directly connected to the lighting controller. If lights 34a-h are connected serially within each set 30a-c to the lighting controller 10, lights 34a-h within each set 30a-c may not be individually controlled, but may only be controlled (e.g., turned on or off, or dimmed) as a group. Each set 30a-c of lights 34a-h may be referred to as a "station." Each of the lights 34a-h, motion detectors 36a-c, and/or light detectors 38a-c may be secured to a ground stake 40 or, alternatively, may use a bracket or other mechanism for positioning.

Each of the sets 30a-c of lights 34a-h, may be associated with a motion detector 36a-c and/or a light detector 38a-c. Accordingly, in various embodiments, when a first motion detector 36a detects motion, the lighting controller 10 may transmit electrical current to the first set 30a of lights 34a-c to turn on the lights 34a-c. In alternative embodiments, when a first motion detector 36a detects motion, lights 34a h within two or more of the sets 30a-c are turned on or off.

Likewise, a single light detector 38a-c may affect operation of all of the sets 30a-c of lights 34a-h or one or more of the sets 30a-c of lights 34a-h. For example, if a certain light level is detected by one or more of the light detectors 38a-c, one or more of the sets 30a-c of lights 34a-h may be turned on or off in response to a corresponding signal from one of the light detectors 38a-c. In alternative embodiments, there is only one motion detector 36a and/or light detector 38a in electrical communication with the lighting controller 10.

Each of the lights 34a-h, motion detectors 36a-c, and light detectors 38a-c may be in electrical communication with the lighting controller 10 via an electrical conduit 32, which may comprise a tangible medium (e.g., a copper wire or fiber-optic medium) or may involve wireless communication.

Figure 2:
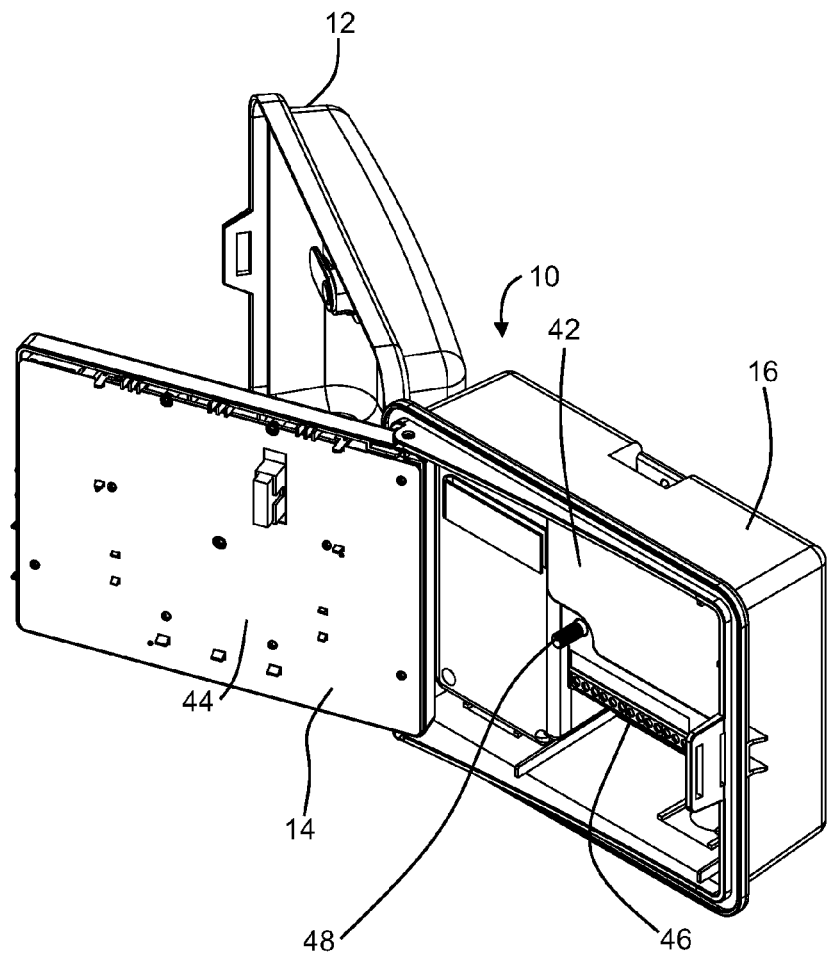
FIG. 2 is a perspective view of one embodiment of a lighting controller shown with a pivoting control panel pivoted away from a base of a lighting controller.

FIG. 2 is a perspective view of one embodiment of the lighting controller 10. As shown in FIG. 2, the pivoting control panel 14 and cover 12 have been pivoted away from the base 16. Accordingly, a light threshold adjustment knob 48 and wir7e connection section 46 are visible and accessible. In alternative embodiments, the light threshold may be adjustable by the controls 22 and display screen 20 or the knob 48 may be accessible without pivoting the control panel 14 and/ or cover 12 away from the base 16. The wire connection section 46 is used, in various embodiments, for securing wiring for the lights 34a-h, motion detectors 36a-c, and light detectors 38a-c to the lighting controller 10 such that the lights 34a-h, motion detectors 36a-c, and light detectors 38a-c are in electrical communication with the lighting controller 10. The wire connection section 46 may be positioned in alternative locations within or outside the housing 26 of the lighting controller 10.

The pivoting control panel 14 may include a circuit board 44 that performs various operations in connection with the lighting controller 10. The lighting controller 10 may include a switched-mode power supply 42. The switched-mode power supply 42 switches between an on and off state in operation and alters output voltage based on the ratio of on-to-off time. The switched-mode power supply 42 may also issue a fault message (rather than malfunctioning) when a maximum load is exceeded. The switched-mode power supply 42 and circuit board 44 may be positioned at various locations within the lighting controller 10. It should also be noted that different types of power supplies (which may include a magnetic transformer) may be used within the lighting controller 10. In various embodiments, the power supply 42 may include one or more rectifiers for converting alternating current to direct current.

Also, the circuit board 44 may be connected to the lighting controller 10 via a ribbon cable. Thus, the circuit board 44, in one configuration, may be removable and programmable by a user.

Figure 3:
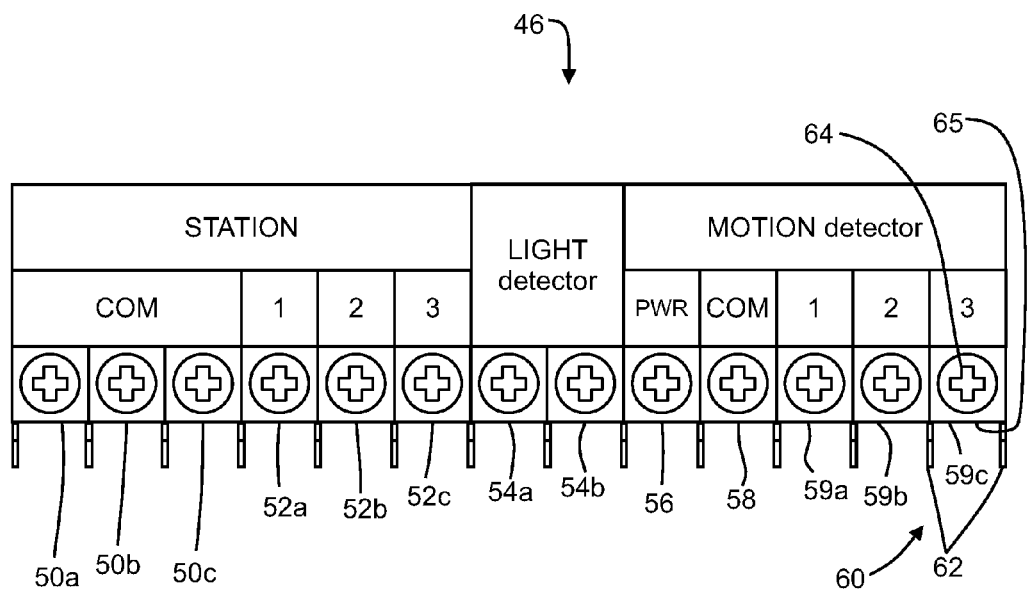
FIG. 3 is a plan view of a wire connection section for a lighting controller.

FIG. 3 comprises a plan view of one embodiment of a wire connection section 46. The illustrated wire connection section 46 includes a series of stalls 60 with dividing walls 62. Each stall 60 includes an opening 65 and a screw 64 for securing a corresponding wire to a wire receptor 50a-c, 52a-c, 54a-b, 56, 58, 59a-c within each stall 60.

As illustrated, the wire connection section 46 may include three common wire receptors 50a-c for the stations (e.g., sets 30a-c of lights 34a-h) and three powered wire receptors 52a-c for each of the stations. The wire connection section 46 may also include a first and a second wire receptor 54a-b for a light detector 38a-c. The wire connection section 46 may further comprise a powered wire receptor 56, a common wire receptor 58, and control wire receptors 59a-c for each motion detector 36*a-c*. The wire connection section 46 shown in FIG. 3 is merely illustrative as the number and positioning of the wire receptors 50*a-c*, 52*a-c*, 54*a-b*, 56, 58, 59*a-c* may be varied to accommodate a different number of stations, light detectors 38*a-c*, and/or motion detectors 36*a-c*.

Figure 4:
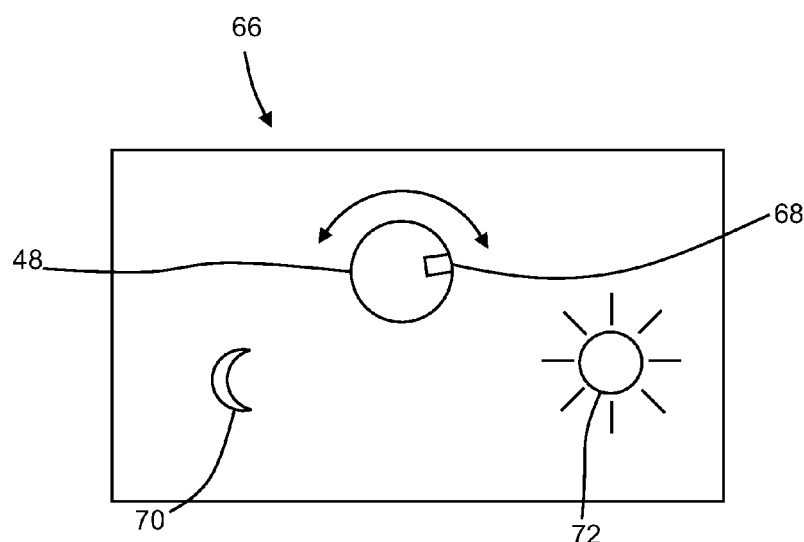
FIG. 4 is a plan view of a light threshold section.

FIG. 4 comprises a plan view of one embodiment of a light sensitivity section 66 for a lighting controller 10. The light threshold section 66 may include a light threshold adjustment knob 48 having a knob pointer 68 that is rotatable relative to a decrease threshold icon 70 and an increase threshold icon 72. As noted above, the threshold of the light detectors 38*a-c* may be adjusted individually or as a group or, alternatively, adjustments may be made using the controls 22 and display screen 20 of the lighting controller 10. When the threshold of the light detector(s) 38*a-c* is increased, the amount of light required to trigger either power-on or power-off action is increased. When the threshold of the light detectors is decreased, the amount of light required to trigger either power on or power off is decreased. In alternative embodiments, a power-off and power-on threshold are independently configurable for the lighting controller. Also, the power-off and power-on threshold for each light detector 38*a-c* may be independently configurable with multiple knobs 48 or controls 22.

Figure 5:
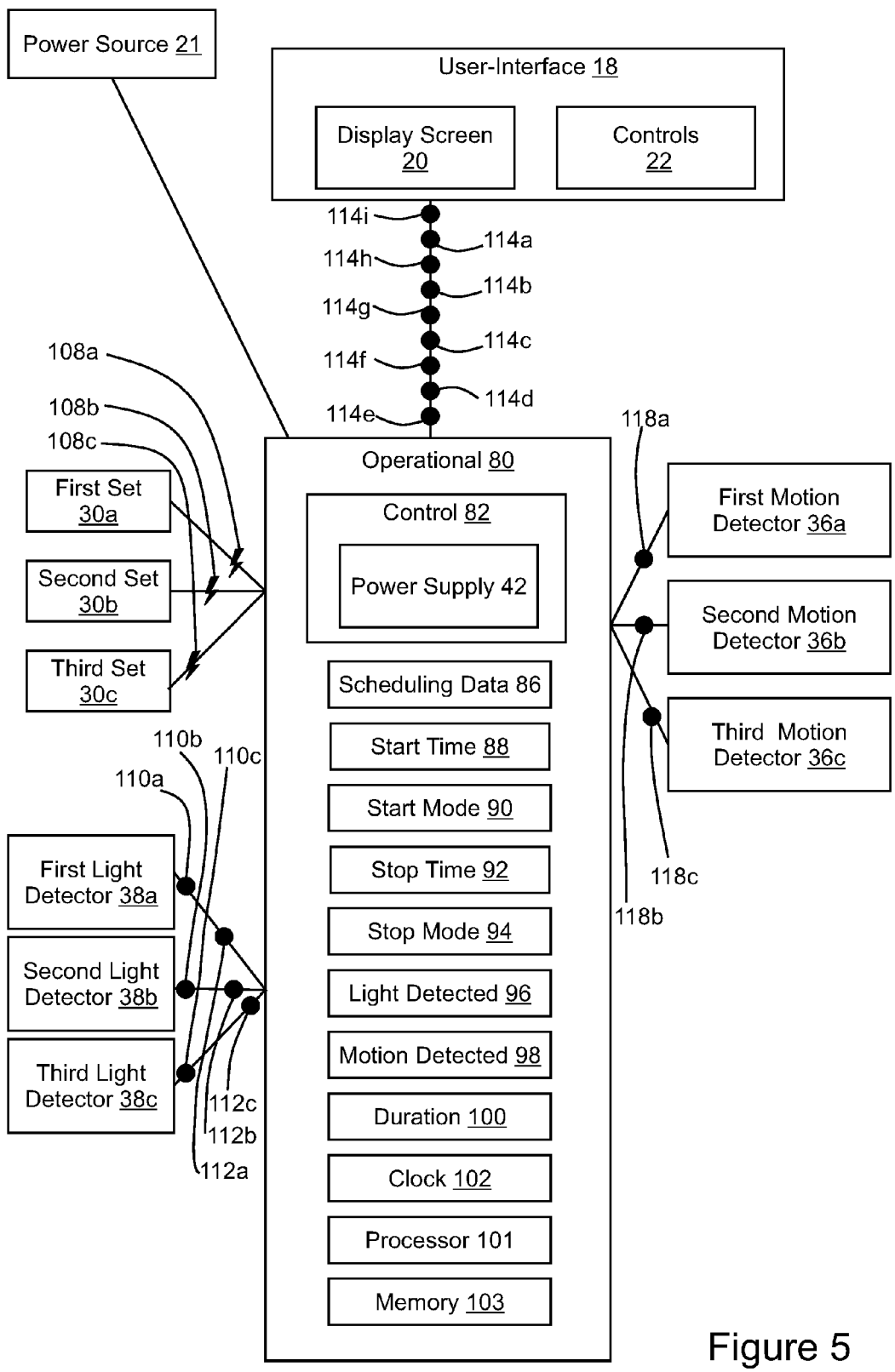
FIG. 5 is a block diagram illustrating embodiments of a user interface and an operational module of the lighting controller shown together with a power source, sets of lights, light detectors and motion detectors.

FIG. 5 is a functional block diagram illustrating functional components of a user interface module 18 and operational module 80 of a lighting controller 10. FIG. 5 also illustrates three sets 30*a-c* of lights 34*a-c*, three motion detectors 36*a-c* and three light detectors 38*a-c* for use with the lighting controller 10. Each of the functional blocks shown in FIG. 5 may represent a physical component or a logical component involving physical hardware (e.g., a processor 101 and memory 103), software, and/or firmware.

As illustrated, the user interface 18 of the lighting controller 10 may include a display screen 20 displaying various user prompts or information. The user interface may also include various controls 22, which will be discussed in greater detail below, for receiving user input to the lighting controller 10.

The operational module 80 performs various operations and includes a control module 82, which may comprise a power supply 42, scheduling data 86, a start-time module 88, a start-mode module 90, a stop-time module 92, a stop-mode module 94, a light-detected module 96, a motion-detected module 98, a duration module 100, and a clock module 102.

In response to scheduling data 86 and/or signals 114*f-i* received from the user interface 18, the control module 82, working in conjunction with the switched-mode power supply 42, transmits electrical current 108*a-c* to each of the sets 30*a-c* of lights 34*a-h*. For example, a manual-power-on signal 114*h* or a manual-power-off signal 114*g* from the user interface 18 may cause the control module 82 to commence transmitting or terminate transmitting electrical current 108*a-c* to one or more of the sets 30*a-c* of lights 34*a-h*. As noted above, the power supply 42 may be coupled to a power source 21.

Referring briefly to FIGS. 6-8, these figures provide additional amplification of scheduling data 86. FIG. 6 illustrates a first set 121*a* of scheduling data 86 for a first set 30*a* of lights 34*a-c*, a second set 121*b* of scheduling data 86 for a second set 30*b* of lights 34*d-e*, and a third set 121*c* of scheduling data 86 for a third set 30*c* of lights 34*f-h*. The first set 121*a* of scheduling data 86 may comprise first start data 120*a* and first stop data 122*a*. The first set 121*a* may further comprise a second start data 120*b* and second stop data 122*b*. The second set 121*b* of scheduling data 86 may comprise third start data 120*c*, third stop data 122*c*, fourth start data 120*d*, and fourth stop data 122*d*. The third set 121*c* of scheduling data 86 may comprise fifth start data 120*e*, fifth stop data 122*e*, sixth start data 120*f*, and sixth stop data 122*f*. The pairs of start and stop data 120*a-f*, 122*a-f* each define conditions for turning on and turning off a respective set 30*a-c* of lights 34*a-h*, such as for turning on and off lights 34*a-h* in the evening and morning, as desired. As illustrated in FIG. 6, each set 121*a-c* of scheduling data 86 includes two pairs of start and stop data 120*a-f*, 122*a-f*. In alternative embodiments, the number of pairs of start and stop data 120*a-f*, 122*a-f* may be varied within the scope of the disclosed subject matter. In addition, the scheduling data 86 may include start data 120*a-f* but no stop data 122*a-f*, allowing a user to manually turn off the lights 34*a-h*, as desired.

In various embodiments, each set of start data 120*a-f* and stop data 122*a-f* is independently configurable. In various embodiments, for example, the first start data 120*a*, third start data 120*c*, and fifth start data 120*e* may be jointly configurable (i.e., configured at the same time rather than individually) depending on user input to the user interface 18. Also, in various embodiments, the first stop data 122*a*, third stop data 122*c*, and fifth stop data 122*e* may be jointly configurable.

As illustrated in FIG. 7, first start data 120*a* may involve a first start mode 124*a* and a second start mode 124*b*. The first start mode 124*a* may comprise a particular time of day 126*a* and days of the week 128*a* on which to turn on the first set 30*a* of lights 34*a-c*. The second start mode 124*b* may comprise a light level 130*a* at which the first set 30*a* of lights 34*a-c* will be turned on and the days of the week 128*b* for which this light level 130*a* is applicable. In various embodiments, either the first start mode 124*a* or the second start mode 124*b* is in force for the first start data 120*a*. In alternative embodiments, the first start mode 124*a* and the second start mode 124*b* may both be in force (e.g., the first start mode 124*a* applies on Monday through Friday, while the second start mode 124*b* applies on Saturday and Sunday). In addition, the first start data 120*a* may involve a single mode or two or more modes (not shown). Each of the sets of start data 120*a-f* may include one or more start modes 124*a-b*.

FIG. 8 illustrates first stop data 122*a* having a first stop mode 132*a*, which may comprise a particular time of day 126*b* and an interval 134 (e.g., every other day or every Monday) to turn off the first set 30*a* of lights 34*a-c*. A second stop mode 132*b* may involve a light level 130*b* at which the first set 30*c* are turned off when the identified light level 130*b* is reached or passed for particular days of the week 128*c*. The number of stop modes 132*a-b* may be varied within the scope of the disclosed subject matter. Also, the stop modes 132*a-b* may be concurrently or alternatively in force. Also, each of the sets of stop data 122*a-f* may also include one or more stop modes 132*a-b*.

Referring once again to FIG. 5, the control module 82 working in connection with a light-detected module 96 and scheduling data 86 may commence or terminate transmitting electrical current 108*a-c* to the sets 30*a-c* of lights 34*a-h*. As indicated previously, the turning on and turning off of the lights 34*a-h* may be based on light levels in accordance with the scheduling data 86. For example, in response to receipt of a first type of light-detected signal 110*a-c* from one or more of the light detectors 38*a-c* at the light-detected module 96, the light-detected module 96 may signal the control module 82 to commence transmitting electrical current 108*a-c* to one or more of the sets 30*a-c* of lights 34*a-h*. The first type of light-detected signal 110*a-c*, in various embodiments, may be triggered by a light detector 38*a-c* detecting a light level descending below a threshold level. In addition, in response to receipt of a second type of light-detected signal 112*a-c* at the light-detected module 96, the light-detected module 96 may signal the control module 82 to terminate transmission of electrical current 108*a-c* to one or more of the sets 30*a-c* of lights 34*a-h*. The second type of light-detected signal 112*a-c*, in various embodiments, may be triggered by a light detector 38*a-c* detecting a light level rising above a threshold level. In various embodiments, the first type of light-detected signal 110*a-c* and the second type of light-detected signal 112*a-c* comprise the same sequence of pulses, but are merely transmitted at different times or interpreted differently by the light-detected module 96.

The control module 82 working in connection with a motion-detected module 98 may also commence and cease transmitting electrical current 108*a-c* to the sets 30*a-c* of lights 34*a-h* based on a motion-detected signal 118*a-c*. For example, a duration module 100 may receive a duration signal 114*c* from the user interface 18 indicating that the first set 30*a* of lights 34*a-c* are to be turned on for a period of 20 minutes in response to a first motion-detected signal 118*a* from the first motion detector 36*a*. As explained previously, in response to receipt of one or more motion-detected signals 118*a-c* at the motion-detected module 98, the motion-detected module 98 may signal the control module 82 to transmit electrical current 108*a-c* to one or more sets 30*a-c* of lights 34*a-h* for a specified duration of time. In various embodiments, the motion-detected module 98 may cause the lights 34*a-h* to be activated irrespective of the scheduling data 86, i.e., simply in response to a motion-detected signal 118*a-c*.

It should be noted that the signals 114*a-i* from the user interface 18 may each comprise a set of one or more electrical or optical pulses in response to a single or multiple user-input actions performed on the user interface 18. Also, the first type of light-detected signal 110*a-c*, second type of light-detected signal 112*a-c*, and motion-detected signal 118*a-c* may comprise a set of one or more electrical or optical pulses.

The start-time module 88 may receive a time-of-day signal 114*f* from the user interface to identify a particular time of day and a days-of-the-week signal 114*e* to identify days of the week (Monday through Sunday) for commencing transmission of electrical current 108*a-c* for one or more sets of start data 120*a-f*. Also, the start-mode module 90 may receive a start-mode signal 114*a* from the user interface 18 to identify which start mode or modes 124*a-b* will be employed in connection with one or more sets of start data 120*a-f*.

The stop-time module 92 may receive a time-of-day signal 114*f* from the user interface 18 to identify a particular time of day and a days-of-the-week signal 114*e* to identify days of the week (Monday through Sunday) to terminate transmitting electrical current 108*a-c* for one or more sets of stop data 122*a-f*. The stop-mode module 94 may receive a stop-mode signal 114*b* from the user interface 18 to identify which stop mode or modes 132*a-b* will be employed in connection with one or more sets of stop data 122*a-f*.

In addition, a clock module 102 may receive a current time and day signal 114*i* from the user interface 18 to identify a current time, date, and/or day of the week. The clock module 102 may further comprise an internal clock that interacts with the scheduling data 86 and control module 82 to determine when electrical current 108*a-c* should be transmitted to the sets 30*a-c* of lights 34*a-h*.

The power supply 42, in one embodiment, may be configured to transmit a fault-message signal 114*d* when a pertinent load threshold is exceeded by the power supply 42. This fault-message signal 114*d* notifies a user, for example, that too many lights 34*a-h* have been connected to the lighting controller 10. In one embodiment, the fault-message signal 114*d* may identify which of the stations has been overloaded.

In view of the foregoing, the control module 82 may be configured to transmit electrical current 108*a* in accordance with a first set 121*a* of scheduling data 86 to a first set 30*a* of one or more lights 34*a-c*, in accordance with a second set 121*b* of scheduling data 86 to a second set 30*b* of one or more lights 34*d-e*, and in accordance with a third set 121*c* of scheduling data 86 to a third set 30*c* of one or more lights 34*f-h*. The first set of scheduling data 121*a* may include at least first start data 120*a* and first stop data 122*b*, the second set 121*b* of scheduling data 86 including at least the third start data 120*c* and the third stop data 122*c*, and the third set 121*c* of scheduling data 86 including at least fifth start data 120*e* and fifth stop data 122*e*.

The light-detected module 96 may be configured to receive a first type of light-detected signal 110*a* from a light detector 38*a*.

The start-mode module 90 may be configured to receive a first start-mode signal 114*a* indicating either a first start mode 124*a*, in which the first start data 120*a* specifies a particular time of day 126*a* for transmission of electrical current 108*a* to the first set 30*a* of one or more lights 34*a-c*, or a second start mode 124*b*, in which the first start data 120*a* specifies transmission of electrical current 108*a* to the first set 30*a* of one or more lights 34*a-c* in response to receipt of the first type of light-detected signal 110*a*.

The stop-mode module 94 may be configured to receive a first stop-mode signal 114*b* indicating either a first stop mode 132*a*, in which the first stop data 122*a* specifies a particular time of day 126*b* for termination of transmission of electrical current 108*a* to the first set 30*a* of one or more lights 34*a-c* or a second stop mode 132*b*, in which the first stop data 122*a* specifies termination of transmission of electrical current 108*a* to the first set 30*a* of one or more lights 34*a-c* in response to receipt of the second type of light-detected signal 112*a*.

The motion-detected module 98 may be configured to receive a first motion-detected signal 118*a* from a first motion detector 36*a* and to signal the control module 82 to transmit electrical current 108*a* to at least one of the first, second and third sets 30*a-c* of one or more lights 34*a-h* in response to receipt of the first motion-detected signal 118*a* irrespective of the first start data 120*a*, the third start data 120*c*, and the fifth start data 120*e*.

The motion-detected module 98 may be configured to signal the control module 82 to transmit electrical current 108*a* to only the first set 30*a* of one or more lights 34*a-c* in response to receipt of the first motion-detected signal 118*a*.

Alternatively, the motion-detected module 98 may be configured to signal the control module 82 to transmit electrical current 108*a-c* to each of the first, second, and third sets 30*a-c* of one or more lights 34*a-h* in response to receipt of the first motion-detected signal 118*a*.

In various embodiments, the motion-detected module 98 is configured to signal the control module 82 to transmit electrical current 108*a* to the first set 30*a* of one or more lights 34*a-c* in response to receipt of the first motion-detected signal 118*a* irrespective of the first and second start data 120*a-b*, and is configured to signal the control module 82 to transmit electrical current 108*b* to the second set 30*b* of one or more lights 34*d-e* in response to receipt of the second motion-detected signal 118*b* irrespective of the third and fourth start data 120*c-d*, and is configured to signal the control module 82 to transmit electrical current 108*c* to the third set 30*c* of one or more lights 34*f-h* in response to receipt of the third motion-detected signal 118*c* irrespective of the fifth and sixth start data 120*e-f*.

The start-time module 88 may be configured to receive a time-of-day signal 114f specifying the particular time of day 126a for the first start data 120a when in the first start mode 124a.

It should also be noted that the operational module 80 may further comprise one or more processors 101 and one or more types of memory 103 (e.g., volatile and non-volatile memory) and other components which are not illustrated, such as a communication bus. User interface 18 may also utilize the processor 101 and memory 103 of the operational module 80 or have its own processor and memory.

FIGS. 9-25 comprises diagrams illustrating embodiments of a user interface 18 having a display screen 20 and various controls 22a-k. FIGS. 9-25 further serve to illustrate various functions and ways of interacting with a lighting controller 10.

Figure 9:
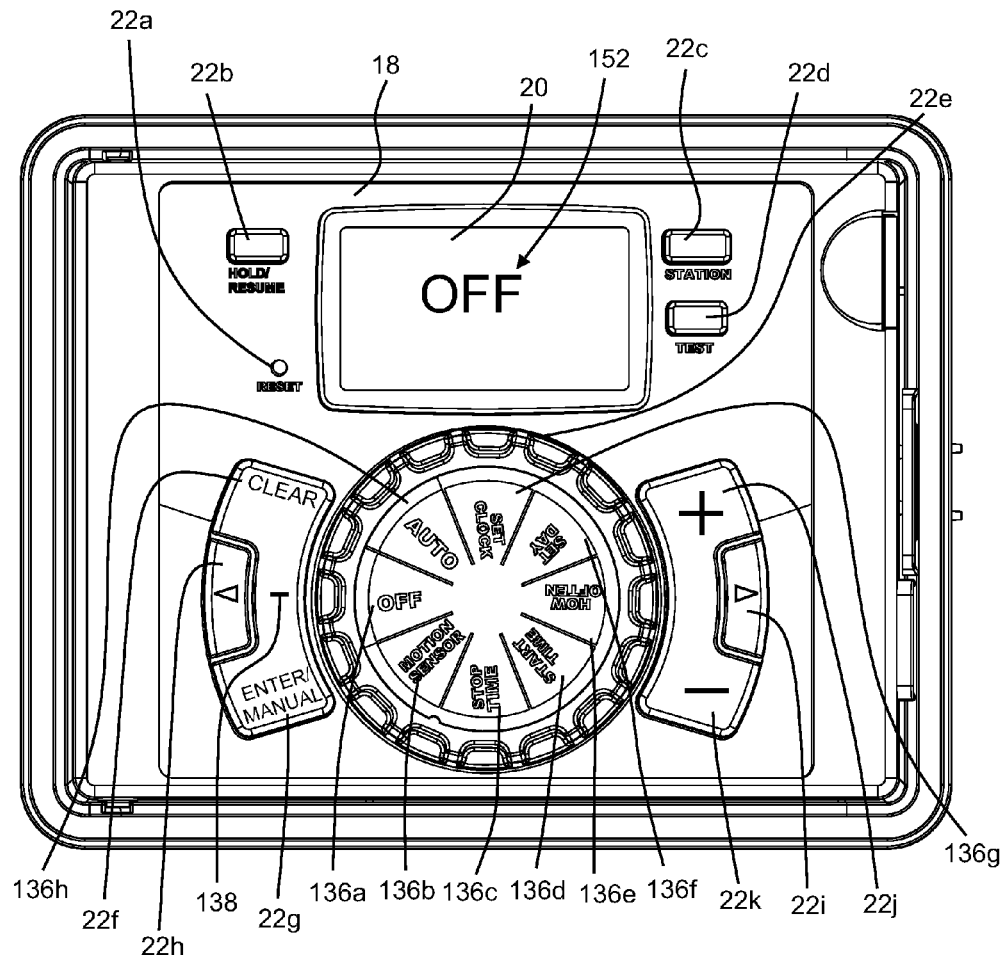
FIGS. 9-25 illustrate various embodiments of and functions performed in connection with the user interface for a lighting controller.

In particular, FIG. 9 illustrates a reset control 22a, a hold/resume control 22b, a station control 22c, a test control 22d, a dial control 22e with various settings 136a-h, a clear control 22f, an enter/manual control 22g, a first directional control 22h, a second directional control 22i, an increment control 22j, and a decrement control 22k. The settings of the dial control 22e include an off setting 136a, a motion detector setting 136b, a stop-time setting 136c, a start-time setting 136d, a how often setting 136e, a set day setting 136f, a clock set setting 136g, and an auto setting 136h. A dial marker 138 indicates which setting 136a-h has been selected for the dial control 22e. As illustrated in FIG. 9, the dial control 22e has been rotated to the off setting 136a. In this state, the off icon 152 is displayed on the display screen 20 and the lighting controller 10 does not transmit current to any lights 34a-h. The icons disclosed herein, such as the off icon 152, are merely illustrative and alternative embodiments of these icons may be employed in connection the disclosed subject matter.

The reset control 22a may be activated to reset the lighting controller 10 to default factory settings.

The hold/resume control 22b may be used to terminate operation of scheduled on/off lighting operations for a period of time upon activation of this control 22b. The hold may be removed by activating the hold/resume control 22b again.

The test control 22d may be activated to turn on all of the stations (i.e., all of the connected lights 34a-h) for testing purposes. In various embodiments, the test may be terminated upon expiration of a set or adjustable time period or upon activation of the test control 22d a second time.

Figure 10:
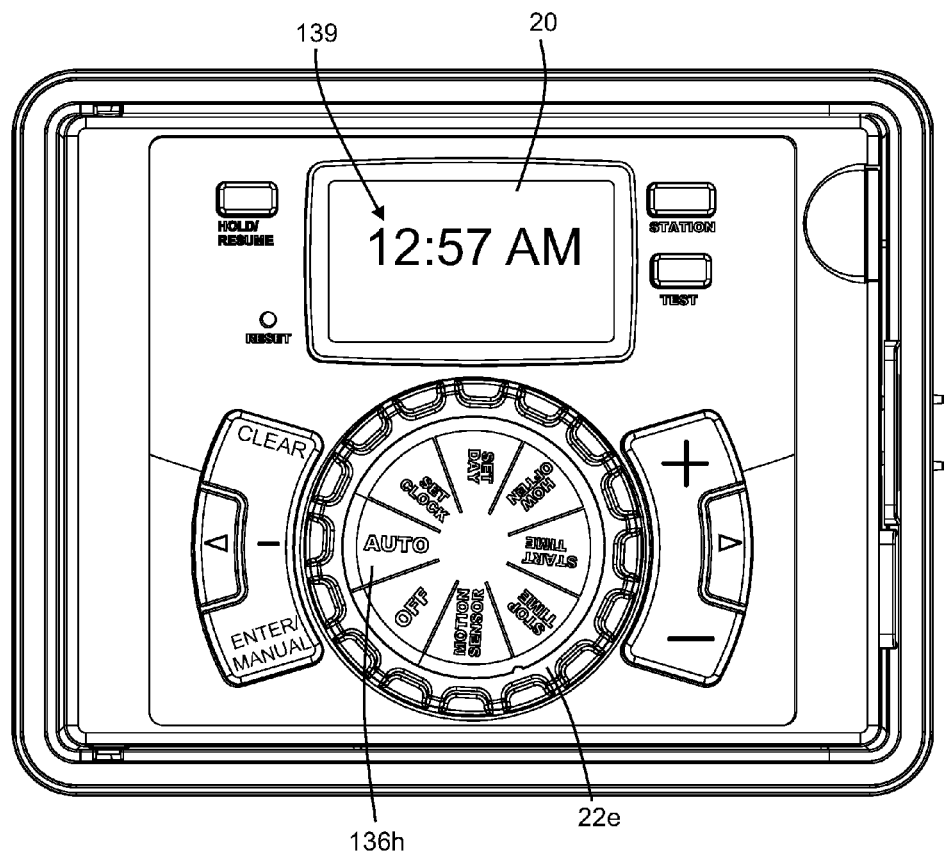
Figure 11:
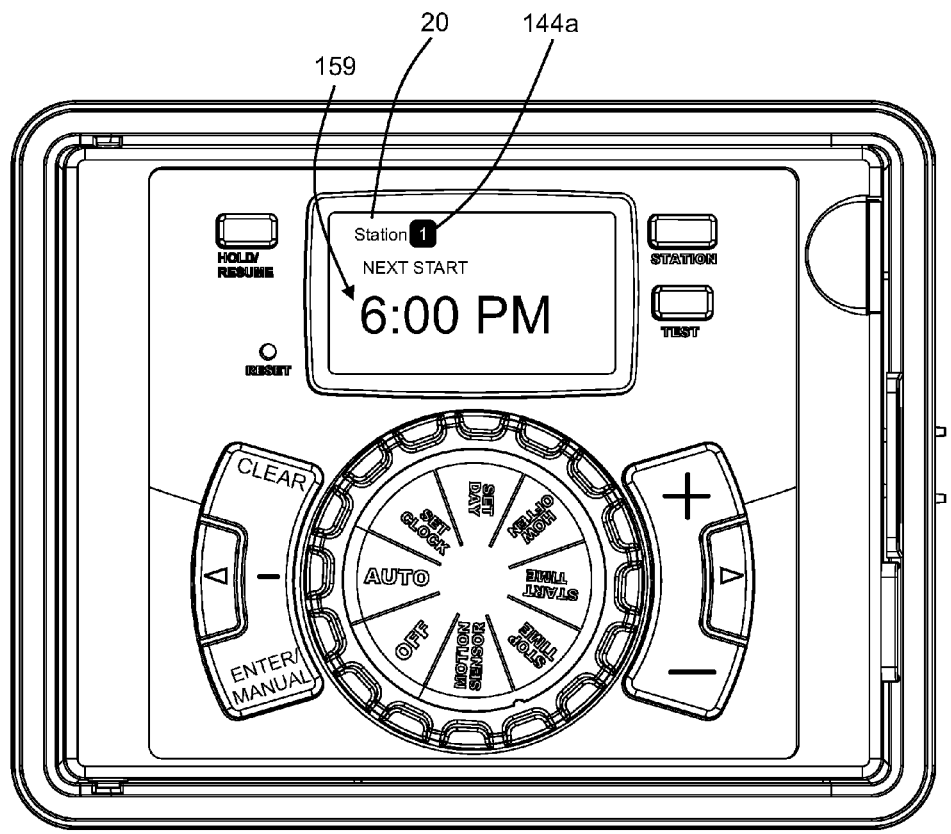

With respect to FIG. 10, the dial control 22e has been rotated to the auto setting 136h. In this state, the lighting controller 10 operates in accordance with scheduling data 86 to provide electrical current 108a-c to one or more lights 34a-h. In various embodiments, in such a setting 136h, the display screen 20 may alternatively display a current time icon 139, which indicates the current time, and a next start-time icon 159, as illustrated in FIG. 11. Referring now to FIG. 11, a first station icon 144a may also be used to identify that the first station (e.g., the first set 30a of one or more lights 34a-c) are scheduled to come on at the identified time. Other station icons could be displayed to indicate that those stations will also turn on at the specified time.

Figure 12:
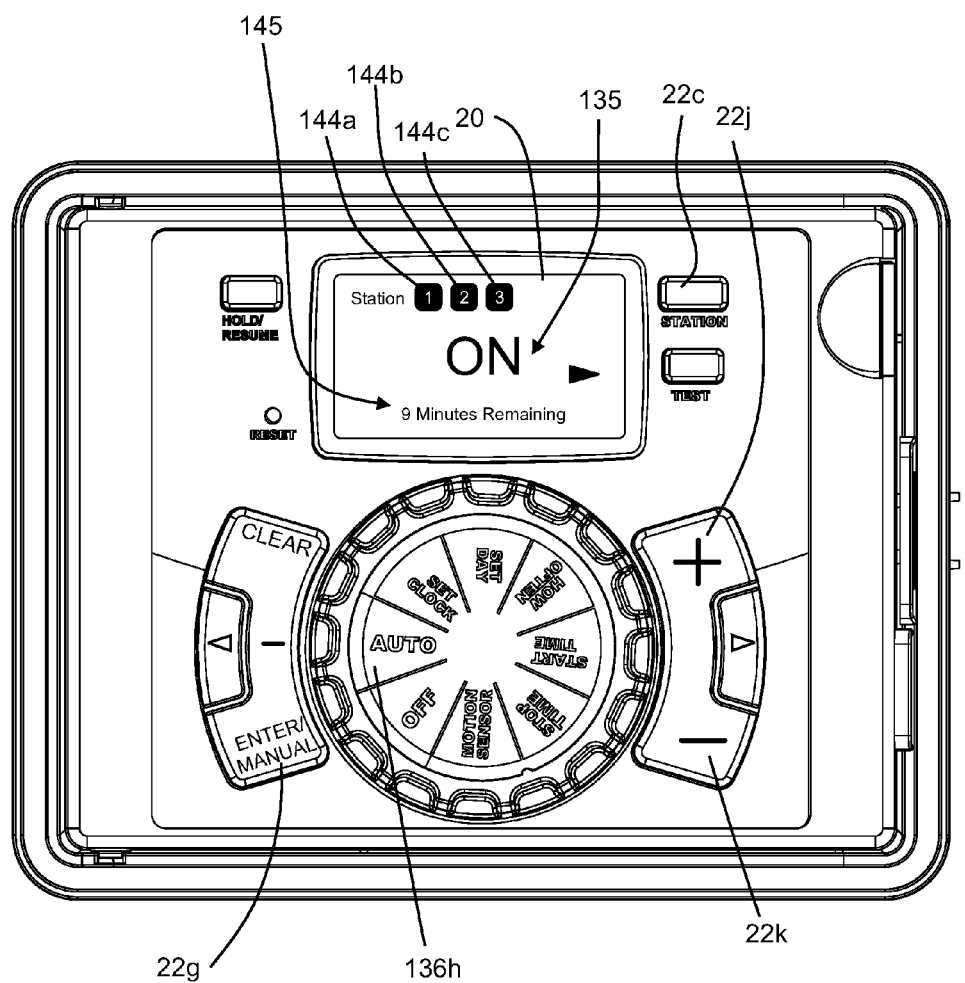
Figure 13:
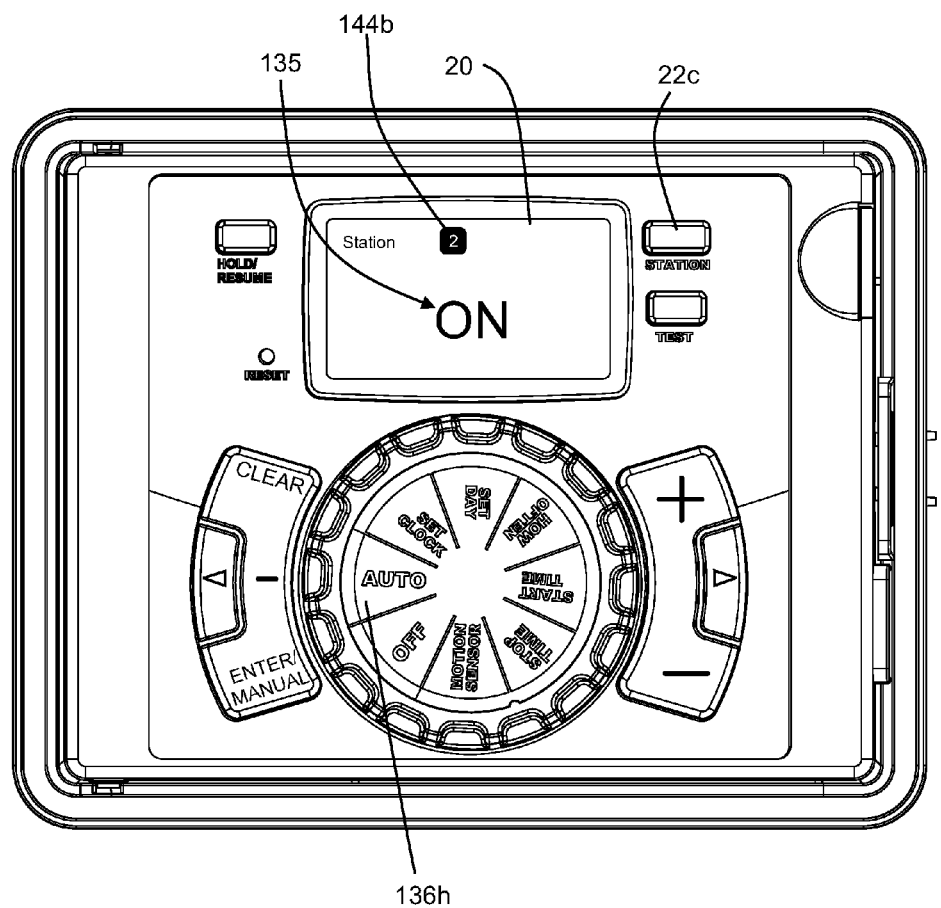

With reference to FIG. 12, when the auto setting 136h has been selected, the enter/manual control 22g may be activated. In response to activating the enter/manual control 22g, all three stations may be turned on as evidenced by the first station icon 144a, second station icon 144b, and third station icon 144c and the on icon 135 shown on the display screen 20. In various embodiments, a time remaining message 145 may be displayed indicating a remaining time during which the stations will be turned on. In one embodiment, the increment control 22j and decrement control 22k may be used to increase or decrease the remaining time. In various embodiments, the station control 22c may be successively activated to toggle between each station and all stations being turned on (e.g., toggling between a first station, a second station (shown in FIG. 13), and a third station being successively activated and all stations being activated at the same time). Also, pressing the enter/manual control 22g may cause all of the stations to be turned off when in the manual mode. In light of the foregoing, the user interface 18 may transmit a manual-power-on signal 114h or a manual-power-off signal 114g depending upon user inputs to the user interface 18 to the enter/manual control 22g or when in the manual mode.

Figure 14:
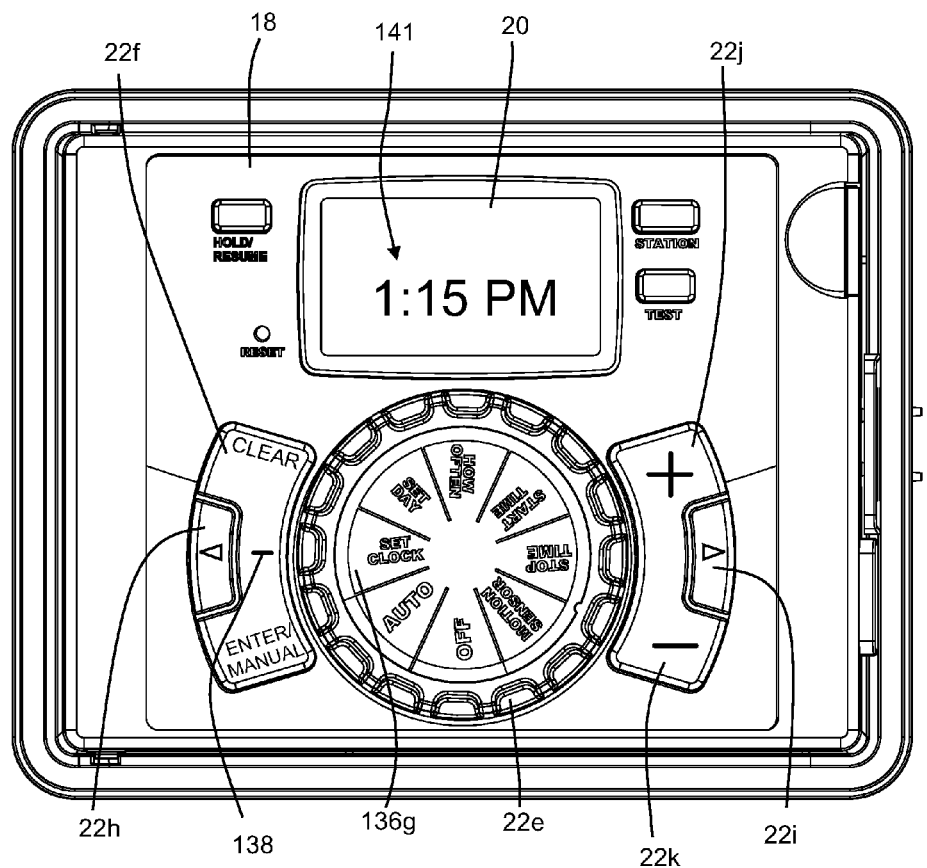

With reference to FIG. 14, the dial control 22e may be rotated to the set clock setting 136g. When this setting 136g is activated, a time set icon 141 showing a current time is displayed on the display screen 20. The first directional control 22h and the second directional control 22i may be used to toggle selection between the hours, minutes, and AM/PM indicator. The increment and decrement control 22j-k may be used to increment or decrement the hours or minutes, when selected. In alternative embodiments, the first directional control 22h and second directional control 22i are used to toggle between displaying AM or PM and the increment control 22j and decrement control 22k are used to decrease or increase the displayed time, such as in minute increments. In various embodiments, the clear control 22f may be used to reset to a default time. Also, in various embodiments, the time shown on the display screen 20 may be set in the lighting controller 10 by rotating the dial control 22e to a different setting 136a-f, 136h.

Figure 15:
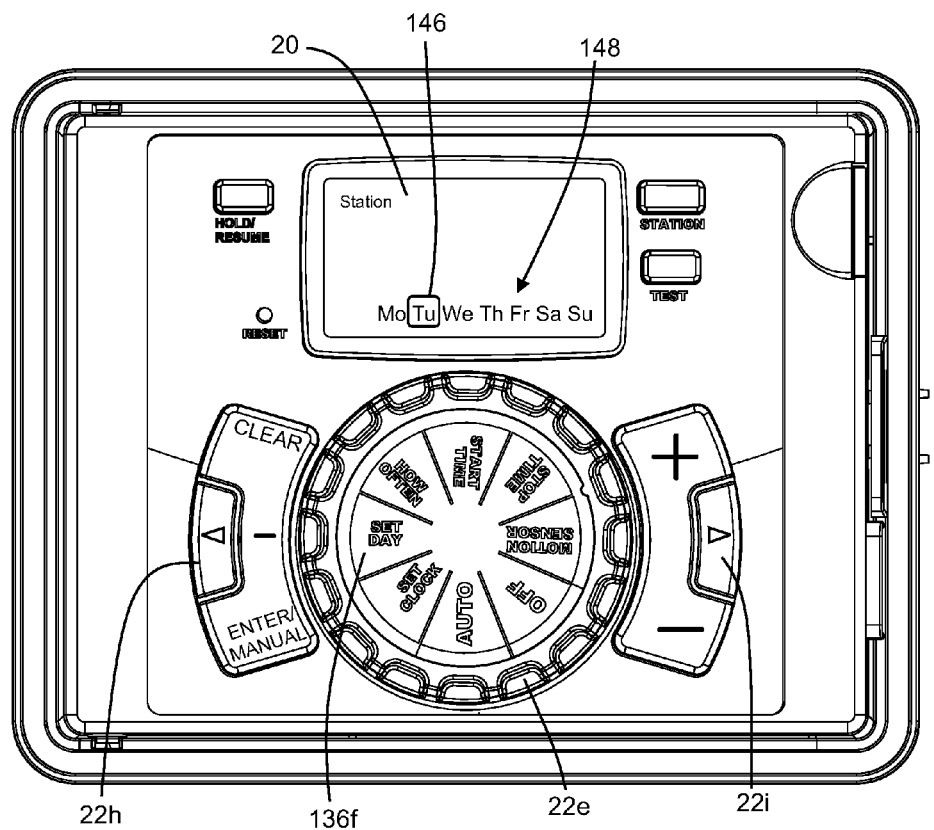

As shown in FIG. 15, the dial control 22e may be rotated to the set day setting 136f. When in this setting 136f, a selection icon 146 may be alternatively positioned to identify different days of the week on the display screen 20 using the first and second directional controls 22h-i. Also, in various embodiments, the day of the week shown on the display screen 20 may be set in the lighting controller 10 by rotating the dial control 22e to a different setting 136a-e, 136g-h. In response to various changes made when in the clock set setting 136g and the day set setting 136f, the user interface 18 may transmit a current time and day signal 114i to a clock module 102.

Figure 16:
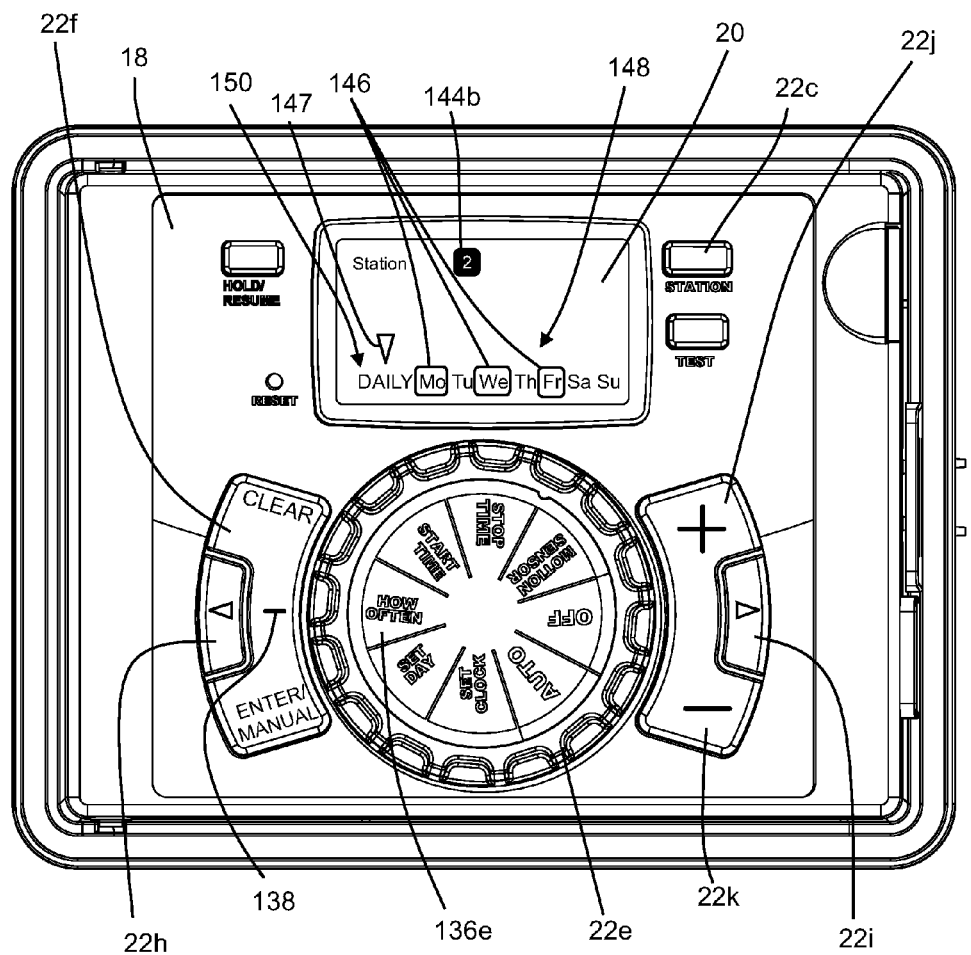

The user interface 18 is shown in FIG. 16 with the dial control 22e rotated to the how often setting 136e. In this setting 136e, the first and second directional controls 22h-i may be utilized to move an active icon 147 successively between the daily icon 150 and the days of the week icons 148. When the desired one of the daily icon 150 and days of the week icons 148 are identified on the display screen 20 by the active icon 147, the increment control 22j may be activated to select the identified icon 148, 150. Thereafter, a selection icon 146 indicates that the particular time period 148, 150 has been selected to activate the lights 34a-h. As illustrated in FIG. 16, the selection icon 146 indicates that Monday, Wednesday, and Friday have been selected for the applicable start time. In various embodiments, a clear control 22f or a decrement control 22k may be used to remove a selection icon 146 when the active icon 147 is positioned on a selected icon 148, 150. Also, the station control 22c may be used to toggle between the stations (e.g., first station, second station, third station, and all stations) to which the displayed how often settings apply. As indicated by the second station icon 144b, the display settings pertain to station two (e.g., the second set 30b of one or more lights 34d-e) in the embodiment shown in FIG. 16. When the dial control 22e is in the how often settings 136e, the user interface 18 may transmit one or more days-of-the-week signals 114e to the start-time module 88 for a pertinent start time 126a in response to user input.

Figure 17:
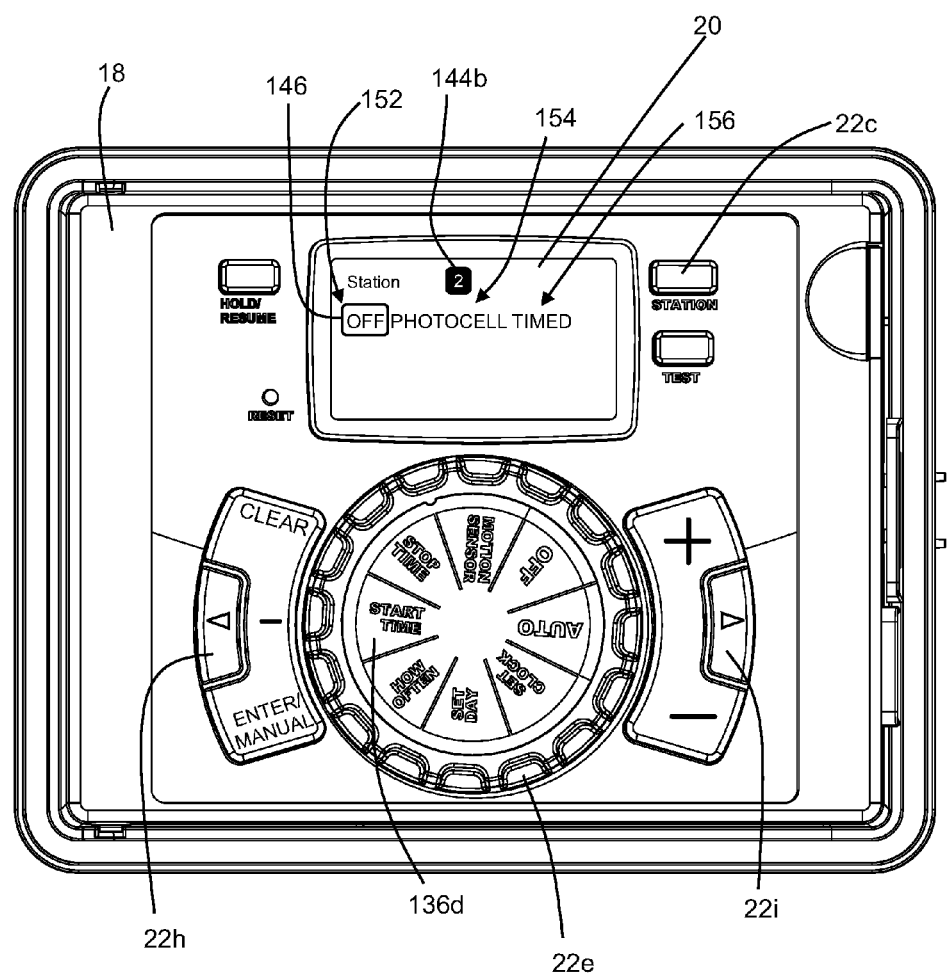

As illustrated in FIG. 17, the dial control 22e may be rotated to the start-time setting 136d. The selection icon 146 may be used to toggle between the off icon 152, the photocell icon 154, and the timed icon 156 using the first and second directional controls 22h-i. In various embodiments, the station control 22c may be activated to toggle between the stations to which the start-time settings apply. In the embodiment illustrated in FIG. 17, the start-time settings apply to the second station, as indicated by the second station icon 144b shown on the display screen 20.

Figure 18:
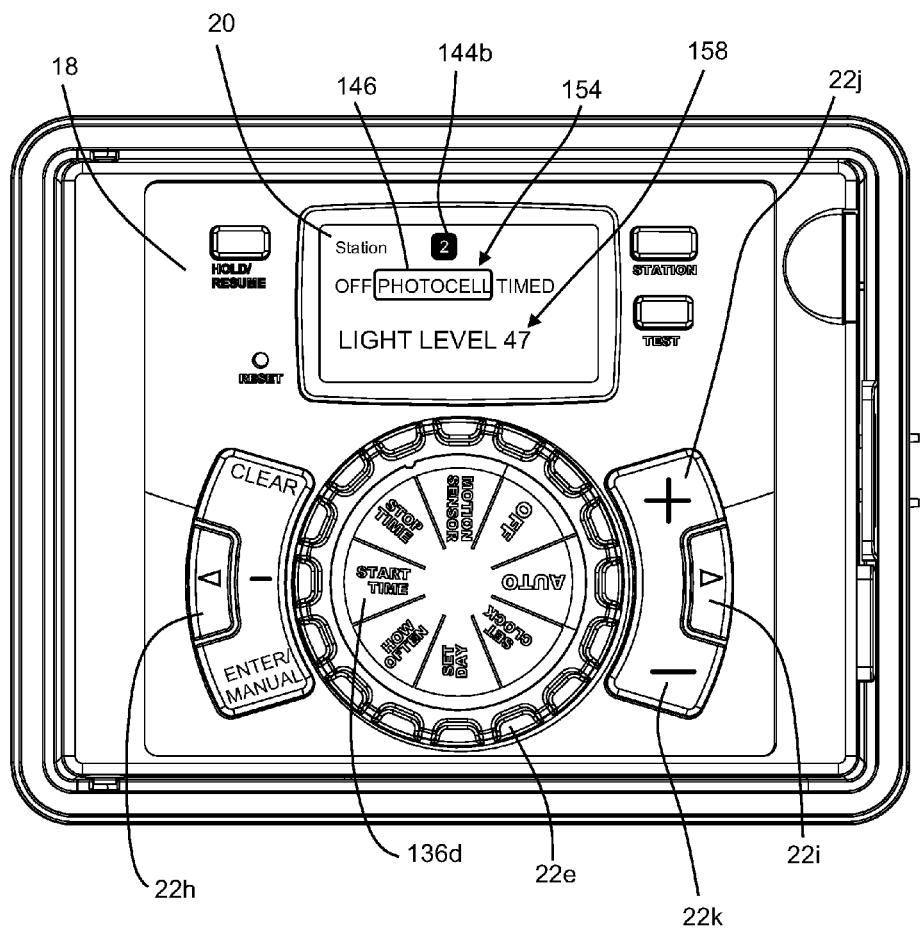

With reference to FIG. 18, the start-time setting 136d of the dial control 22e is active. As shown by the selection icon 146 on the display screen 20, the photocell icon 154 has been selected using the first or second directional controls 22h-i. In various embodiments, a light level may be selected to identify a threshold of light that must be reached in order to activate the second set 30b of lights 34d-e or another set of lights. The increment and decrement controls 22j-k may be used to increase the threshold of light identified by the light level icon 158. In an alternative embodiment, the threshold of light must be set for start and stop times using an adjustment knob 48 (illustrated in FIG. 4). In response to the selections made in this setting 136d, one or more start-mode signals 114a may be transmitted from a user interface to an operational module 80 to indicate a selected mode (i.e., between a timed mode 124a and a photocell mode 124b).

Figure 19:
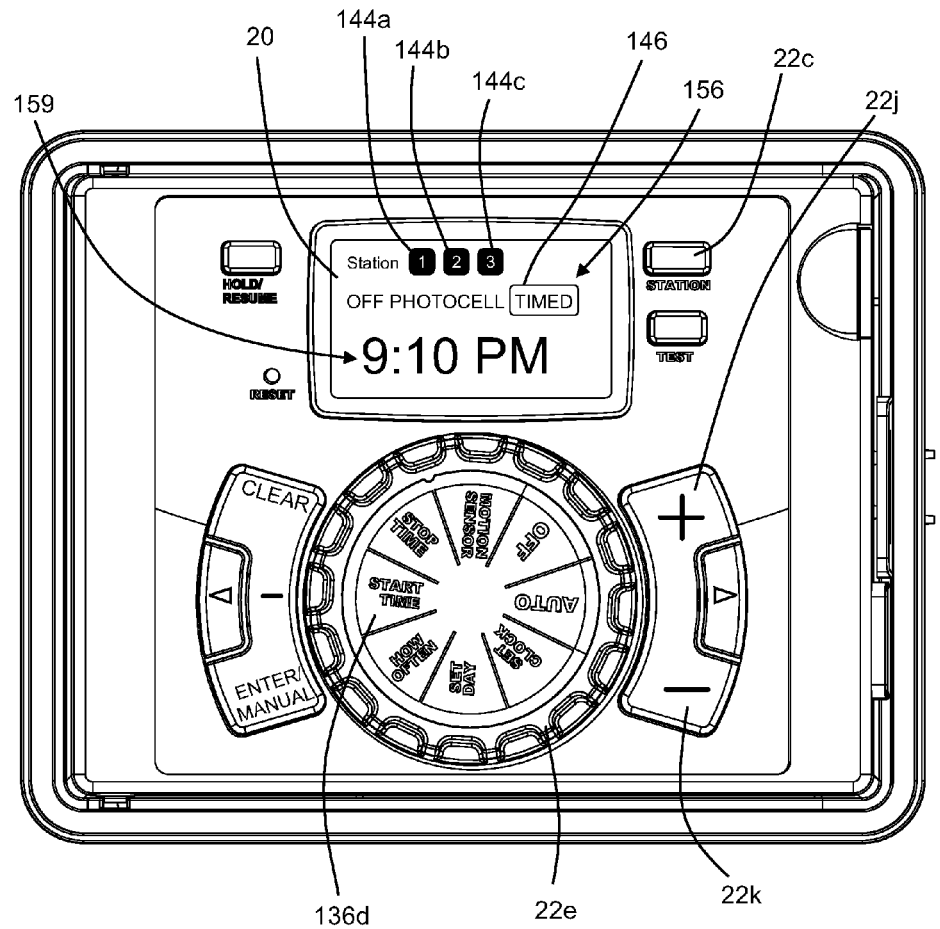
Figure 20:
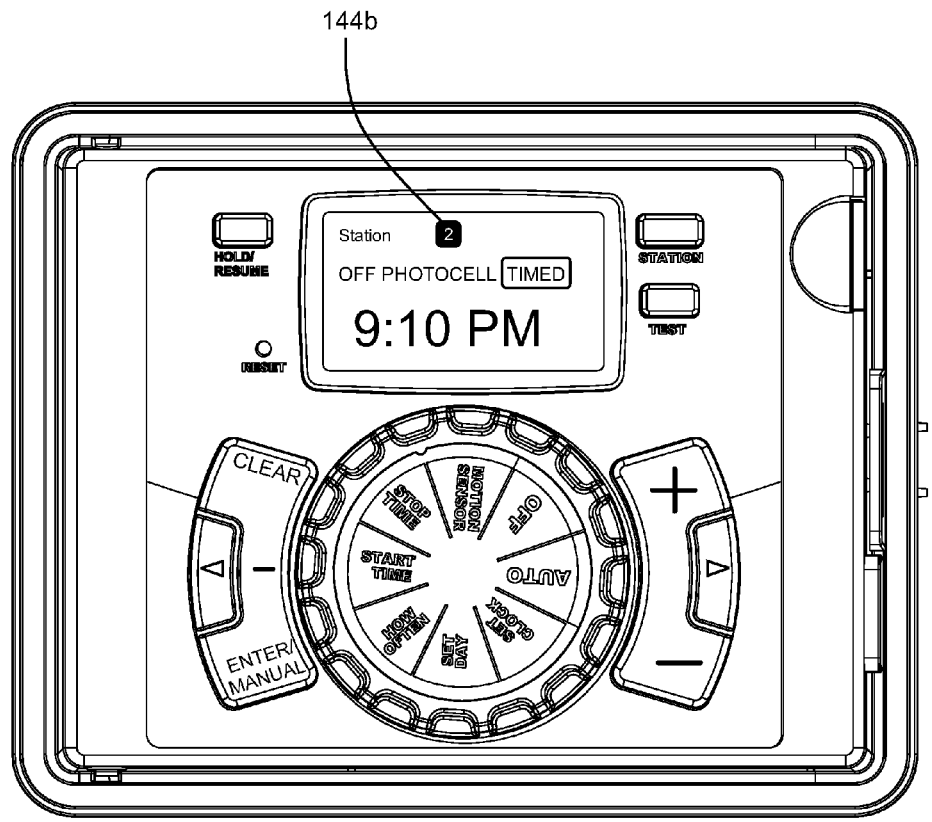

With reference to FIG. 19, the start-time setting 136d of the dial control 122e is active. As shown by the selection icon 146 on the display screen 20, the timed icon 156 has been selected. A start-time icon 156 on the display screen indicates a start time. The increment and decrement controls 22j-k may be used to alter the start time. The station control 22c may be used to toggle between the selected stations. As illustrated in FIG. 19 by the first, second, and third station icons 144a-c, the start time shown on the display screen 20 applies to all three stations. Accordingly, as the start time 126a and other start data 120a-b for all of the stations may be altered at the same time (i.e., by the same user input), the start data 120a-b for each of these stations is jointly configurable. As illustrated in FIG. 20, the start time may also apply to a single one or multiple stations (e.g., the second station, as indicated by the second station icon 144b). In response to selections made in this setting 136d in the timed mode, time-of-day signals 114f may be transmitted from the user interface 18 to the operational module 80.

Figure 21:
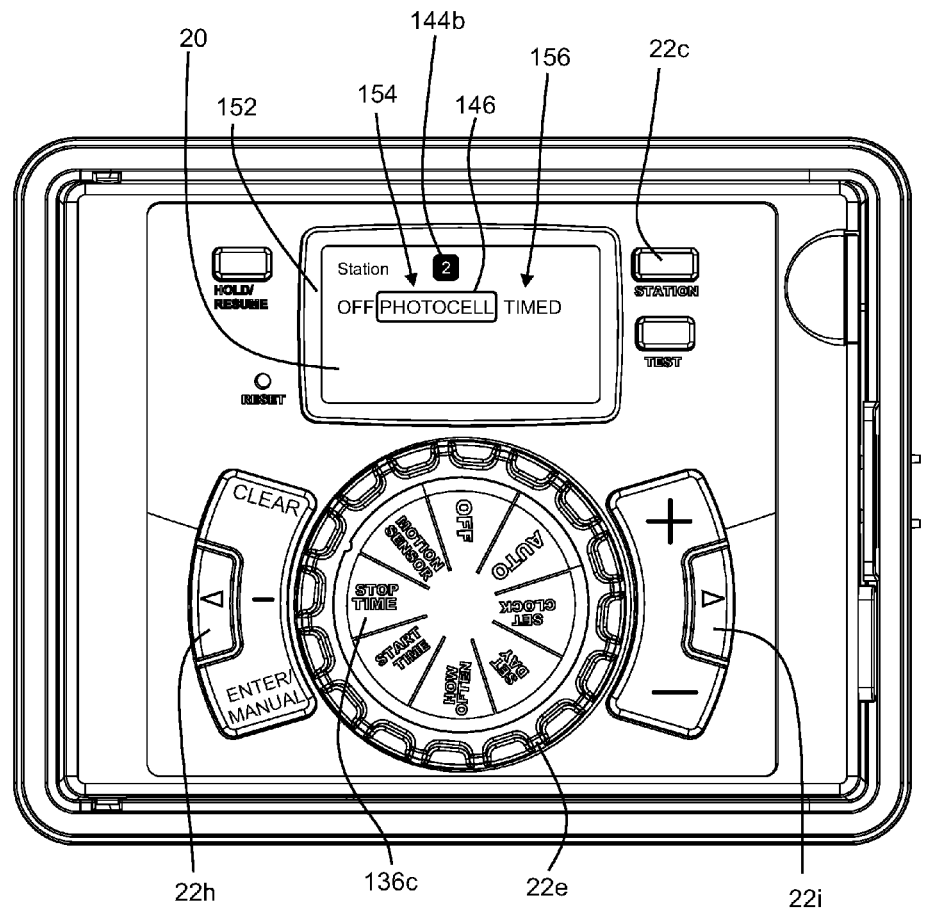

With reference to FIG. 21, the dial control 22e may be rotated to the stop-time setting 136c. The stop-time settings may be applied to one, multiple, or all of the stations. As the stop time 126b and other stop data 122a-f may be altered using the same user input, the stop data 122a-f is jointly configurable. In FIG. 21, the second station icon 144b is displayed indicating that the stop settings entered pertain to a second station, i.e., a second set 30b of lights 34d-e. As indicated previously, the station control 22c may be successively activated to toggle between a first station, a second station, a third station, and all stations. In this setting, an off icon 152, photocell icon 154, and timed icon 156 may be displayed on the display screen 20. The first and second directional controls 22h-i may be used to toggle the selection icon 146 between the off icon 152, the photocell icon 154, and the timed icon 156. As shown in FIG. 21, the selection icon 146 identifies the photocell icon 154, signifying that the second set 30b of lights 34d-e will be turned off based on a signal from a light detector 38b.

Figure 22:
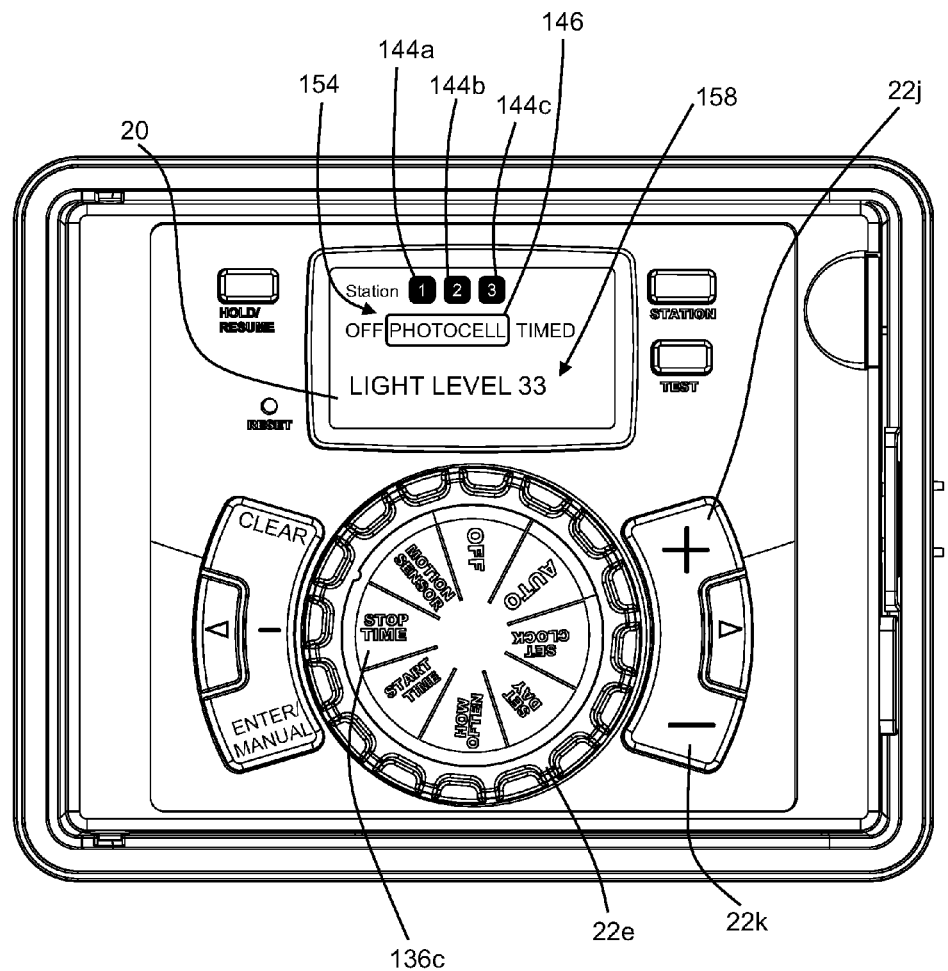

As shown in FIG. 22, in various embodiments, a light level icon 158 may be displayed when the dial control 22e is rotated to the stop-time setting 136c and the photocell icon 154 is identified by the selection icon 146. The threshold light level may be altered, in such an embodiment, utilizing, for example, the increment and decrement controls 22j-k. FIG. 22 further serves to illustrate that the selected stop-time settings may apply to all of the stations (in this case, the first, second, and third stations), as indicated by the first station icon 144a, second station icon 144b and third station icon 144c shown on the display screen 20. Accordingly, as the stop mode 132a-b for all of the stations may be altered at the same time (i.e., by the same user input), the stop data 122a-f for each of these stations is jointly configurable.

Figure 23:
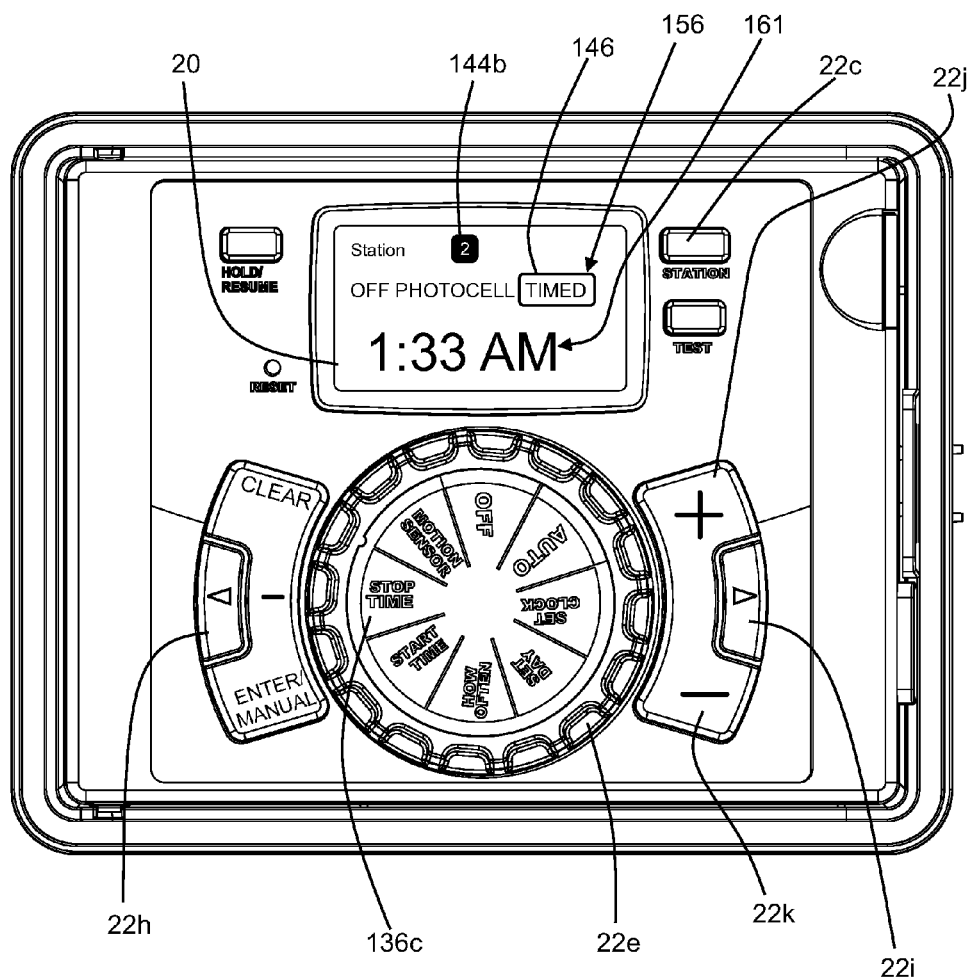

As shown in FIG. 23, the selection icon 146 may be moved from the photocell icon 154 to the timed icon 156 using either the first or second directional control 22h-i when the dial control 22e is set to the stop-time setting 136c. Accordingly, a stop-time icon 161 is provided to display a stop time. The stop time may be increased or decreased utilizing the increment and decrement controls 22j-k. Also, the stations to which the stop time applies may be altered utilizing the station control 22c. As the second station icon 144b is shown on the display screen 20, the stop time displayed applies to the second station (e.g., the second set 30b of one or more lights 34d-e). While the dial control 22e is rotated to the stop-time setting 136c, the user interface 18 may transmit a stop-mode signal 114b, a days-of-the-week signal 114e, and/or time-of-day signal 114f to an operational module 80 in response to user input received at the user interface 18.

Figure 24:
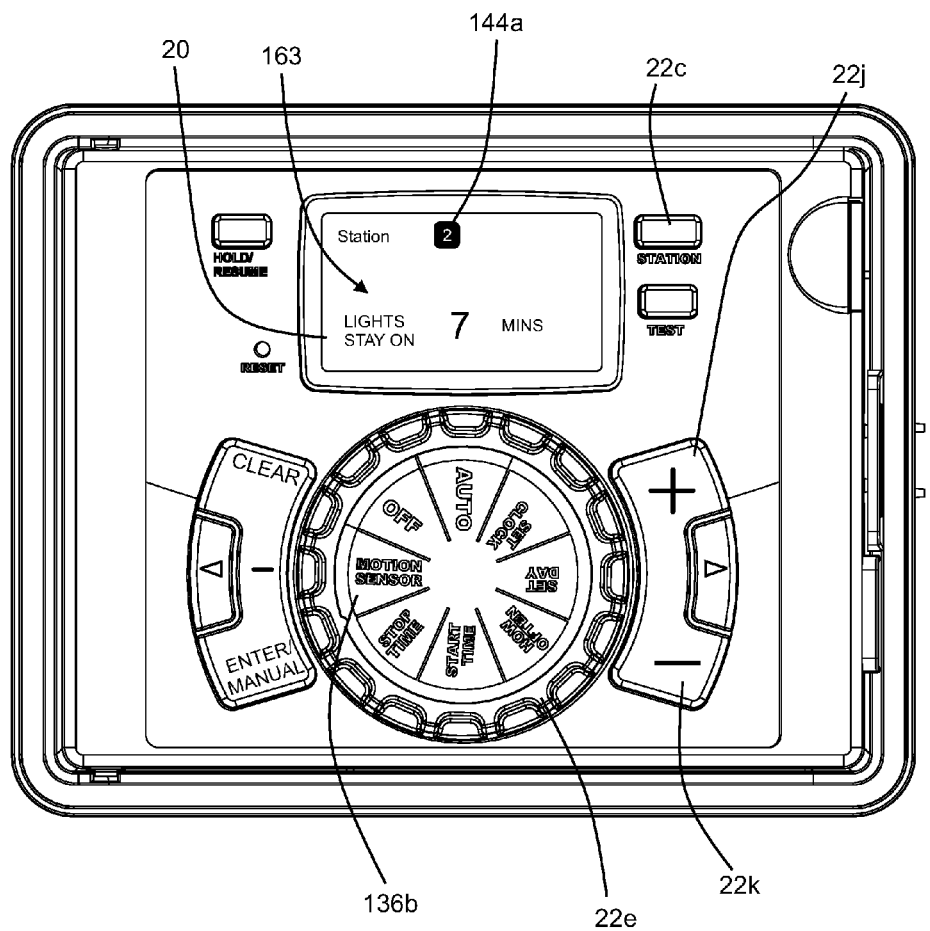

With reference to FIG. 24, the dial control 22e may be rotated to the motion detector setting 136b. In this setting 136b, the stations, which may be activated in response to a motion-detected signal 118a-c from one or more of the motion detectors 36a-c, may be selected using the station control 22c. In the embodiment illustrated in FIG. 24, the second station icon 144b is displayed on the display screen 20, signifying that a second set 30b of lights 34d-e will be activated in response to a motion-detected signal 118a-c from one or more of the motion detectors 36a-c. As discussed previously, the lighting controller 10 may be connected to one or more motion detectors 36a-c. A time-on icon 163 identifies the amount of time that the second set 30b of lights 34d-e will be activated in response to a motion-detected signal 118a-c. In various embodiments, the increment and decrement controls 22j-k may be used to increase or decrease how long the lights 34d-e remain on following receipt of a motion-detected signal 118a-c.

Figure 25:
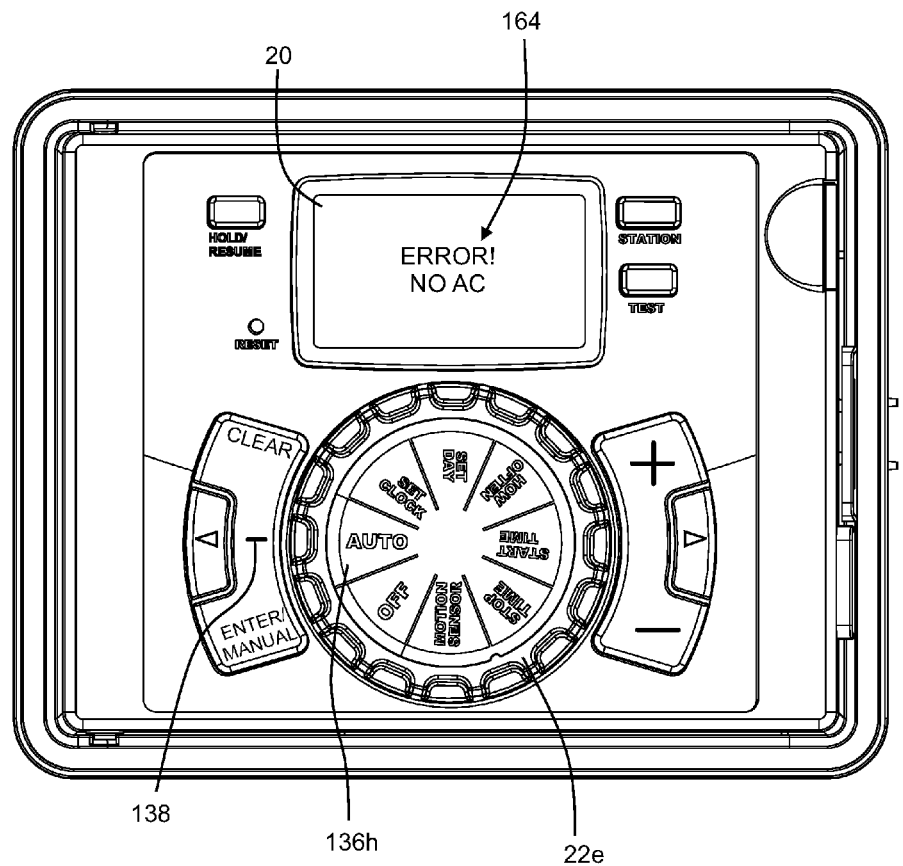

With reference to FIG. 25, the display screen 20 may display a fault-message icon 164 in response to receipt of a fault-message signal 114d. As indicated previously, the fault-message signal 114d may be generated in response to exceeding a maximum load by connecting, for example, too many lights 34a-h to the lighting controller 10.

The disclosed subject matter may be embodied in other specific forms without departing from its structures, methods, or other characteristics as broadly described herein and claimed hereinafter. The described embodiments are to be considered in all respects only as illustrative, and not restrictive. For example, three stations are illustrated. However, the number of stations may be varied within the scope of the disclosed subject matter. Also, the user interface 18 may be remote from the operational components 80. For example, the user interface may comprise a desktop computer or a mobile device, such as a mobile phone. All changes that come within the meaning and range of equivalency of the claims are to be embraced within their scope.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying methods claim the present elements of the various steps is a sample order, and are not meant to be limited to the specific order or hierarchy presented.

The previous description of the disclosed aspects is provided to enable any person skilled in the art to make or use the present disclosure. Various modifications to these aspects will be readily apparent to those skilled in the art, and the principles defined herein may be applied to other aspects without departing from the scope of the disclosure. Thus, the present disclosure is not intended to be limited to the aspects shown herein, but is to be accorded the widest scope consistent with the principles and novel features disclosed herein.

What is claimed is:

1. A lighting controller comprising:
a control module configurable to transmit electrical current in accordance with a first set of scheduling data to a first set of one or more lights, in accordance with a second set of scheduling data to a second set of one or more lights, and in accordance with a third set of scheduling data to a third set of one or more lights, the first set of scheduling data including at least first start data and first stop data, the second set of scheduling data including at least second start data and second stop data, and the third set of scheduling data including at least third start data and third stop data;
a light-detected module configurable to receive a first type of light-detected signal from a first light detector, the first light detector being separate and discrete from the control module and being remotely positionable relative to the control module;
a start-mode module configurable to receive a first start-mode signal indicating either a first start mode in which the first start data specifies a particular time of day for transmission of electrical current to the first set of one or more lights or a second start mode in which the first start data specifies transmission of electrical current to the first set of one or more lights in response to receipt of the first type of light-detected signal from the first light detector;
a start-time module configurable to receive a time-of-day signal specifying a particular time of day for the first start data when in the first start mode; and
a motion-detected module configurable to receive a first motion-detected signal from a first motion detector and to signal the control module to transmit electrical current to the first and second sets of one or more lights and to not transmit electrical current to the third set of one or more lights in response to receipt of the first motion-detected signal.

2. The lighting controller of claim 1, wherein the first and second start data are independently configurable.

3. The lighting controller of claim 1, wherein the first and second stop data are independently configurable.

4. The lighting controller of claim 1, wherein the first and second start data are jointly configurable.

5. The lighting controller of claim 1, wherein the start-time module is configurable to receive a days-of-the-week signal specifying days of a week for the first start data.

6. The lighting controller of claim 1, wherein the control module comprises a switched-mode power supply configured to transmit a fault-message signal when a maximum load is exceeded.

7. A lighting controller comprising:
a control module configurable to transmit electrical current in accordance with a first set of scheduling data to a first set of one or more lights and in accordance with a second set of scheduling data to a second set of one or more lights, the first set of scheduling data including at least first start data and first stop data and the second set of scheduling data including at least second start data and second stop data;
a light-detected module configurable to receive a first type of light-detected signal from a first light detector, the first light detector being separate and discrete from the control module and being remotely positionable relative to the control module;
a start-mode module configurable to receive a first start-mode signal indicating either a first start mode in which the first start data specifies a particular time of day for transmission of electrical current to the first set of one or more lights or a second start mode in which the first start data specifies transmission of electrical current to the first set of one or more lights in response to receipt of the first type of light-detected signal from the first light detector;
a start-time module configurable to receive a time-of-day signal specifying the particular time of day for the first start data when in the first start mode; and
a test control configured to cause the control module to simultaneously transmit electrical current to each of the lights of the first and second sets of lights in response to a first activation of the test control.

8. The lighting controller of claim 7, wherein the test control is further configured to cause the control module to simultaneously cease transmitting electrical current to each of the lights in the first and second sets of lights in response to a second activation of the test control following the first activation of the test control.

9. The lighting controller claim 7, wherein the first and second stop data are independently configurable.

10. The lighting controller of claim 7, wherein the first and second start data are jointly configurable.

11. The lighting controller of claim 7, a hold/resume control configured to pause operation of the lighting controller in accordance with the first and second sets of scheduling data in response to a first activation of the hold/resume control.

12. The lighting controller of claim 11, wherein the hold/resume control is further configured to resume operation of the lighting controller in accordance with the first and second sets of scheduling data in response to a second activation of the hold/resume control after operation of the lighting controller has been paused in response to the first activation of the hold/resume control.

13. A lighting controller comprising:
a control module configurable to transmit electrical current in accordance with a first set of scheduling data to a first set of one or more lights, in accordance with a second set of scheduling data to a second set of one or more lights, and in accordance with a third set of scheduling data to a third set of one or more lights, the first set of scheduling data including at least first start data and first stop data, the second set of scheduling data including at least second start data and second stop data, and the third set of scheduling data including at least third start data and third stop data;

a light-detected module configurable to receive a first type of light-detected signal from a first light detector, the first light detector being separate and discrete from the control module and being remotely positionable relative to the control module;

a start-mode module configurable to receive a first start-mode signal indicating either a first start mode in which the first start data specifies a particular time of day for transmission of electrical current to the first set of one or more lights or a second start mode in which the first start data specifies transmission of electrical current to the first set of one or more lights in response to receipt of the first type of light-detected signal from the first light detector;

a start-time module configurable to receive a time-of-day signal specifying a particular time of day for the first start data when in the first start mode; and a motion-detected module configurable to receive a first motion-detected signal from a first motion detector and to signal the control module to transmit electrical current to at least one of the first, second and third sets of one or more lights in response to receipt of the first motion-detected signal.

14. The lighting controller of claim 13, wherein the motion-detected module is configurable to signal the control module to transmit electrical current to only the first set of one or more lights in response to receipt of the first motion-detected signal.

15. The lighting controller of claim 13, wherein the motion-detected module is configurable to signal the control module to transmit electrical current to each of the first and second sets of one or more lights in response to receipt of the first motion-detected signal.

16. The lighting controller of claim 13, further comprising a duration module configurable to receive a duration signal specifying a period of time during which at least one of the first and second sets of lights is to be provided with electrical current in response to receipt of the first motion-detected signal.

17. The lighting controller of claim 13, wherein the motion-detected module is further configured to receive a second motion-detected signal from a second motion detector and a third motion-detected signal from a third motion detector.

18. The lighting controller of claim 17, wherein the motion-detected module is configured to signal the control module to transmit electrical current to the first set of one or more lights in response to receipt of the first motion-detected signal, is configured to signal the control module to transmit electrical current to the second set of one or more lights in response to receipt of the second motion-detected signal, and is configured to signal the control module to transmit electrical current to the third set of one or more lights in response to receipt of third motion-detected signal.

19. The lighting controller of claim 13, wherein the first and second start data are independently configurable.

20. The lighting controller claim 13, wherein the first and second stop data are independently configurable.

* * * * *